(12) United States Patent
Tomizawa et al.

(10) Patent No.: US 11,340,736 B2
(45) Date of Patent: May 24, 2022

(54) IMAGE DISPLAY DEVICE, IMAGE DISPLAY METHOD, AND IMAGE DISPLAY PROGRAM

(71) Applicant: SEIKO EPSON CORPORATION, Tokyo (JP)

(72) Inventors: Takashi Tomizawa, Nagano (JP); Hiroaki Baba, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/185,998

(22) Filed: Feb. 26, 2021

(65) Prior Publication Data

US 2021/0271342 A1 Sep. 2, 2021

(30) Foreign Application Priority Data

Feb. 27, 2020 (JP) ............................. JP2020-031345

(51) Int. Cl.
*G06F 3/042* (2006.01)
*G06F 3/038* (2013.01)
*G06F 3/0354* (2013.01)

(52) U.S. Cl.
CPC ............ *G06F 3/0425* (2013.01); *G06F 3/038* (2013.01); *G06F 3/03545* (2013.01)

(58) Field of Classification Search
CPC .... G06F 3/0425; G06F 3/038; G06F 3/03545; G06F 3/011; G06F 3/0304; G02B 27/017; G02B 2027/0138

See application file for complete search history.

(56) References Cited

U.S. PATENT DOCUMENTS

| 8,558,872 | B1 * | 10/2013 | Cho | ........................ G06T 11/00 348/43 |
| 2010/0156787 | A1 * | 6/2010 | Katayama | ............. G06F 3/0304 345/157 |
| 2012/0280948 | A1 * | 11/2012 | Barrus | ................ G06F 3/04883 345/179 |
| 2015/0338924 | A1 | 11/2015 | Watanabe et al. | |
| 2019/0060742 | A1 * | 2/2019 | Moon | ..................... A63F 13/26 |

FOREIGN PATENT DOCUMENTS

JP 2015225374 12/2015

\* cited by examiner

*Primary Examiner* — Koosha Sharifi-Tafreshi
(74) *Attorney, Agent, or Firm* — JCIPRNET

(57) ABSTRACT

Provided is an image display method for performing drawing in a display region overlapping at least with a part of an external scene in a state in which the external scene is visible. The image display method images a region including the display region, and extracts an operating object from a captured image in which this region is imaged, as a region of a color of the operating object. In accordance with a size of the region of the color thus extracted, a drawing mode of the operating object is changed, and image display in the display region is controlled in accordance with the changed drawing mode. As the control of the image display, for example, performing drawing, and moving or replicating a drawn image is assumed.

13 Claims, 14 Drawing Sheets

| SIZE | RECOGNIZING MODE 1 | DRAWING MODE RANGE | RECOGNIZING MODE 2 |
|---|---|---|---|
| S | 2~4 | 5~9 | 10~13 |
| M | 4~9 | 10~19 | 20~24 |
| L | 8~19 | 20~29 | 30~38 |

S: SMALLER, FEMALE, CHILD, HEIGHT LESS THAN 155 cm
M: NORMAL, MALE OF AVERAGE HEIGHT AND WEIGHT OR A LARGE FEMALE,
   HEIGHT FROM 155 cm TO 175 cm
L: LARGER, LARGE MALE, HEIGHT GREATER THAN 175 cm ical Field The present disclosure relates to image display techniques that enable virtual input.

2. Related Art

A variety of mechanisms have been proposed that display a virtual input device, in place of a real input device such as a keyboard, a mouse, or a touch panel, and allow input operations to the device. For example, JP 2015-225374 A discloses an information processing device in which a handwritten character or a figure is input with a gesture. In this information processing device, it is necessary to switch between a pen-on state where drawing is enabled, and a pen-off state, and thus a distance to an operating object such as a finger or a pen for performing a pen input operation is measured using ultrasonic waves or an auto-focus technique for a camera, whether the distance to the operating object satisfies a predetermined condition is determined, on and off of the pen is switched, and the state is displayed.

However, with the technique of JP 2015-225374 A, measurement of transmission and reception times of the ultrasonic waves and ranging by the auto-focus technique for a camera are performed, and thus there have been problems in that special equipment was required, processing took significant time, a time lag occurred with respect to movement of the operating object, and the like.

SUMMARY

The present disclosure can be realized as the following exemplary embodiments or application examples. A first aspect of the present disclosure is an aspect as an image display device. The image display device includes an image display unit configured to display an image with at least a part of an external scene as a display region, an imaging unit configured to image a region including the display region as a captured image, an extraction unit configured to extract an operating object from the captured image as a region of a color of the operating object, a drawing mode change unit configured to change a drawing mode of the operating object in accordance with a size of the extracted region of the color, and a control unit configured to control image display in the image display unit in accordance with the changed drawing mode.

Additionally, a second aspect of the present disclosure is an aspect as an image display method for performing drawing with at least a part of an external scene as a display region. The image display method images a region including the display region, extracts an operating object, as a region of a color of the operating object, from a captured image obtained by imaging the region, changes a drawing mode of the operating object in accordance with a size of the extracted region of the color, and controls image display in the display region in accordance with the changed drawing mode.

Furthermore, a third aspect of the present disclosure is an aspect as an image display program executed by a computer. This image display program implements, by the computer, a function of, with at least a part of an external scene as a display region, imaging a region including the display region, a function of extracting an operating object, as a region of a color of the operating object, from a captured image obtained by imaging the region, a function of changing a drawing mode of the operating object in accordance with a size of the extracted region of the color, and a function of controlling image display in the display region in accordance with the changed drawing mode.

DESCRIPTION OF EXEMPLARY EMBODIMENTS

A. First Exemplary Embodiment

Figure 1:
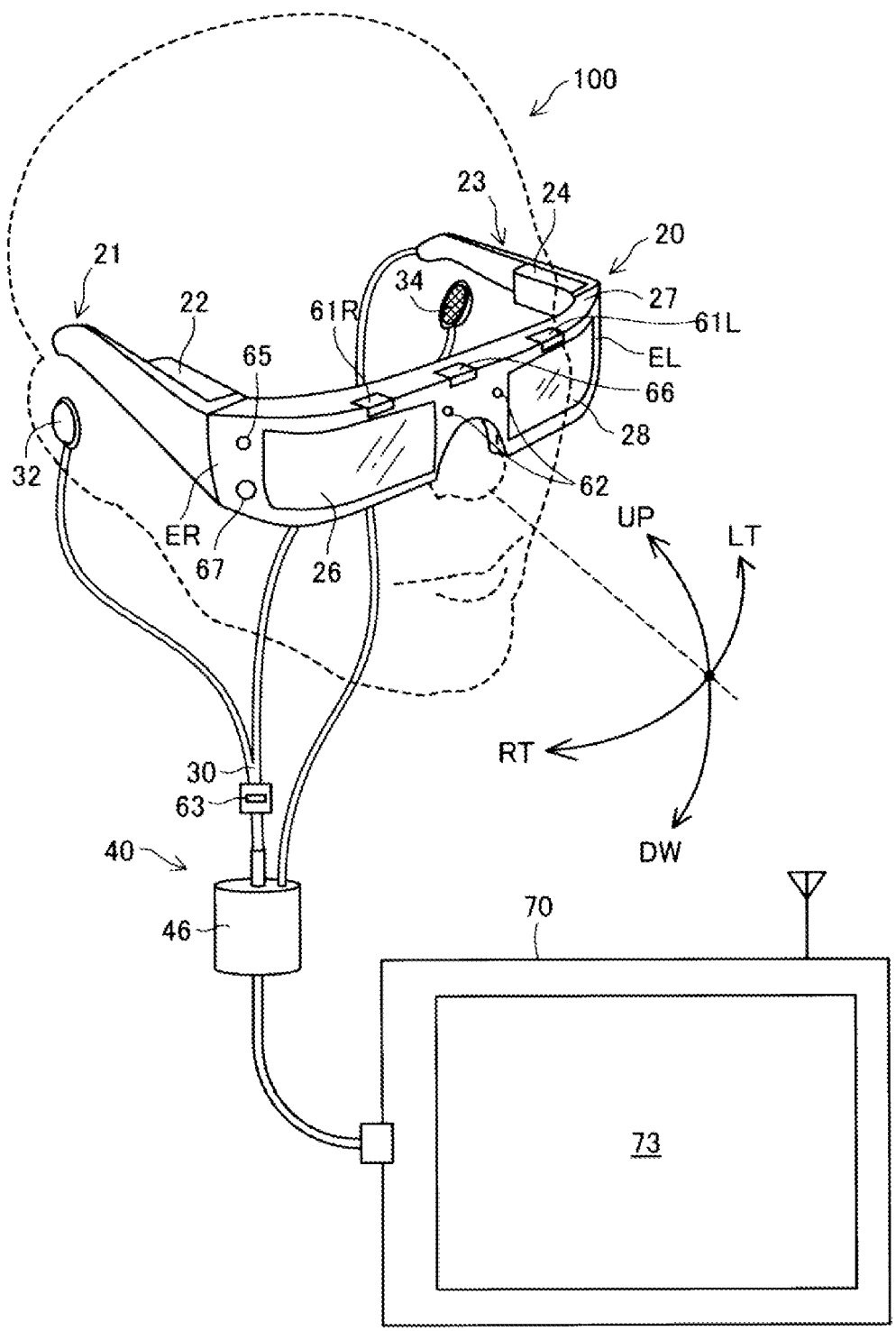
FIG. 1 is an explanatory diagram illustrating an external configuration of an HMD as a display system in an exemplary embodiment.

A-1. Overall Configuration of HMD:

FIG. 1 is a diagram illustrating an external configuration of a Head Mounted Display (head-mounted display apparatus, HMD) 100 as a display system in a first exemplary embodiment. The HMD 100 includes an image display unit 20 as a display device configured to cause a user to visually recognize a virtual image in a state of being worn on a head of the user, and a control device 70 configured to generate an image to be displayed on the image display unit 20. The image display unit 20 is mounted with, in addition to the image display unit a video camera, a six-axis sensor, or the like serving as an imaging unit, and thus particularly a unit of the image display unit 20 that performs image display is referred to as a "first display unit". The first display unit will be described later. On the other hand, the control device 70 exchanges signals with the image display unit 20, reads a sensor value, and performs processing necessary for causing the image display unit 20 to display an image. The control device 70 includes a display 73 having a touch panel function.

As described below, the control device 70 implements functions for performing drawing. Accordingly, the control device 70 serves as an extraction unit, a drawing mode change unit, and a control unit. The user wearing the HMD 100 can perform operations such as performing drawing while visually recognizing an image displayed on the first display unit. At this time, the control device 70 cooperates with the image display unit 20 to recognize movement of an operating object, and realizes drawing.

An image display unit 20 is a head-mounted body to be worn by the user on the head and has an eyeglasses-like shape in the exemplary embodiment. The image display unit 20 includes a main body including a right holding portion 21, a left holding portion 23, and a front frame 27 and further includes, on the main body, a right display unit 22, a left display unit 24, a right light-guiding plate 26, and a left light-guiding plate 28.

The right holding portion 21 and the left holding portion 23 respectively extend rearward from ends of the front frame 27 to hold the image display unit 20 on the user's head in a manner similar to the temples of a pair of eyeglasses. Here, one of both the ends of the front frame 27 located on the right side of the user in a state where the user wears the image display unit 20 is referred to as an end ER, and the other end located on the left side of the user in a state where the user wears the image display unit 20 is referred to as an end EL. The right holding portion 21 is provided to extend from the end ER of the front frame 27 to a position corresponding to the right temple of the user when the user wears the image display unit 20. The left holding portion 23 is provided to extend from the end EL of the front frame 27 to a position corresponding to the left temple of the user when the user wears the image display unit 20.

The right light-guiding plate 26 and the left light-guiding plate 28 are provided in the front frame 27. The right light-guiding plate 26 is positioned in front of the right eye of the user, when the user wears the image display unit 20, to allow the right eye to view an image. The left light-guiding plate 28 is positioned in front of the left eye of the user, when the user wears the image display unit 20, to allow the left eye to view an image.

The front frame 27 has a shape connecting an end of the right light-guiding plate 26 and an end of the left light-guiding plate 28 with each other. The position of connection corresponds to a position between eyebrows of the user when the user wears the image display unit 20. The front frame 27 may include a nose pad portion that is provided at the position of connection between the right light-guiding plate 26 and the left light-guiding plate 28, and that is in contact with the nose of the user when the user wears the image display unit 20. In this case, the nose pad portion, the right holding portion 21, and the left holding portion 23 allow the image display unit 20 to be held on the head of the user. A belt may also be attached to the right holding portion 21 and the left holding portion 23 that fits to the back of the head of the user when the user wears the image display unit 20. In this case, the belt allows the image display unit 20 to be firmly held on the head of the user.

The right display unit 22 is configured to display images on the right light-guiding plate 26. The right display unit 22 is provided on the right holding portion 21 and lies adjacent to the right temple of the user when the user wears the image display unit 20. The left display unit 24 is configured to display images on the left light-guiding plate 28. The left display unit 24 is provided on the left holding portion 23 and lies adjacent to the left temple of the user when the user wears the image display unit 20.

The right light-guiding plate 26 and the left light-guiding plate 28 according to the exemplary embodiment are optical parts (e.g., prisms or holograms) formed of a light transmission-type resin or the like, and are configured to guide imaging light output by the right display unit 22 and the left display unit 24 to the eyes of the user. Surfaces of the right light-guiding plate 26 and the left light-guiding plate 28 may be provided with dimmer plates. The dimmer plates are thin-plate optical elements having a different transmittance for a different wavelength range of light, and function as so-called wavelength filters. The dimmer plates are arranged to cover a surface of the front frame 27 (a surface opposite to a surface facing the eyes of the user), for example. Appropriate selection of optical properties of the dimmer plates allows the transmittance of light to a desired wavelength range, such as visible light, infrared light, and ultraviolet light to be adjusted, and allows the amount of outside light entering the right light-guiding plate 26 and the left light-guiding plate 28 and passing through the right light-guiding plate 26 and the left light-guiding plate 28 to be adjusted.

The image display unit 20 is configured to guide imaging light generated by the right display unit 22 and the left display unit 24 to the right light-guiding plate 26 and the left light-guiding plate 28, respectively, and to use this imaging light to cause the user to visually recognize a virtual image (this is also referred to as "displaying an image"). When the outside light traveling from the front of the user passes through the right light-guiding plate 26 and the left light-guiding plate 28 and enters the eyes of the user, the imaging light forming a virtual image and the outside light enter the eyes of the user. The visibility of the virtual image viewed by the user can be affected by the intensity of the outside light.

The visibility of the virtual image may thus be adjusted, for example, by mounting dimmer plates on the front frame 27 and by appropriately selecting or adjusting the optical properties of the dimmer plates. In a typical example, dimmer plates may be selected to have a light transmittance to allow the user with the HMD 100 as the display system to view at least an outside scenery. The use of the dimmer plates is also expected to be effective in protecting the right light-guiding plate 26 and the left light-guiding plate 28 to prevent, for example, damage and adhesion of dust to the right light-guiding plate 26 and the left light-guiding plate 28. The dimmer plates may be removably attached to the front frame 27 or each of the right light-guiding plate 26 and the left light-guiding plate 28. Alternatively, different types of removable dimmer plates may be provided for replacement, or alternatively the dimmer plates may be omitted.

The image display unit 20 is provided with, in addition to the members described above regarding to image display, video cameras 61R and 61L serving as an imaging unit, an inner camera 62, an illuminance sensor 65, a six-axis sensor 66, and an indicator 67. The two video cameras 61R and 61L are arranged above the front frame 27 of the image display unit 20. The two video cameras 61R and 61L are provided at positions approximately corresponding to both the eyes of the user respectively in the present exemplary embodiment, however, the video cameras 61R and 61L may be provided anywhere, and may be arranged at the ends ER and EL of the front frame 27 respectively.

Each of the video cameras 61R and 61L is a digital camera including an imaging lens, and an imaging element such as a charge-coupled device (CCD) and a complementary metal oxide semiconductor (CMOS). Each of the video cameras 61R and 61L is configured to capture an image of at least part of an external scene (real space) in a front direction of the HMD 100, in other words, in a direction of the field of view of the user when the user wears the image display unit 20. Each of the video cameras 61R and 61L is configured to capture an image in a range overlapping the field of view of the user or an image in the direction of the field of view of the user, i.e., an image in a direction of a scene viewed by the user. In the exemplary embodiment, a width of an angle of view of each of the video cameras 61R and 61L is set to allow the camera 61 to capture the entire field of view that is visible to the user through the right light-guiding plate 26 and the left light-guiding plate 28. An optical system capable of appropriately setting the width of the angle of view of each of the video cameras 61R and 61L may be provided. In addition, in the present exemplary embodiment, since a distance to the operating object using the video camera 61R as the imaging unit is recognized without using parallax of images imaged by the two video cameras 61R and 61L, the video camera may be monocular, that is, the video camera 61L may be absent. When a monocular video camera is used, the number of video cameras can be reduced to one, thereby simplifying the device configuration. Further, software for imaging can also be simplified. In the case of the monocular video camera, the video camera 61R may be provided at a central portion of the image display unit 20.

Similar to the video cameras 61R and 61L, the inner camera 62 is a digital camera equipped with an imaging lens and an imaging element such as a CCD and a CMOS. The inner camera 62 is configured to capture an image in an inner direction of the HMD 100, in other words, in a direction facing the user wearing the image display unit 20. The inner camera 62 of the present exemplary embodiment includes an inner camera for capturing an image of the right eye of the user, and an inner camera for capturing an image of the left eye of the user. In the present exemplary embodiment, a width of an angle of view of the inner camera 62 is set within a range in which an image of the entire right eye or the entire left eye of the user can be captured. The inner camera 62 is used to detect a position of the user's eyeball, particularly a pupil, and calculate a direction of the user's line-of-sight from respective pupil positions of both the eyes. Of course, the inner camera 62 may be provided with an optical system capable of appropriately setting the width of the angle of view, and may be used to read the user's expression or the like by imaging not only the pupil of the user but also a further wider region. Note that, the inner camera 62 need not be provided.

The illuminance sensor 65 is arranged on the end ER of the front frame 27 and is configured to receive outside light from the front of the user wearing the image display unit 20. The illuminance sensor 65 is configured to output a detected value corresponding to the amount of received light (intensity of received light). The LED indicator 67 is disposed at the front frame 27. The LED indicator 67 is configured to be turned on during image capturing by the video cameras 61R and 61L to notify that the image capturing is in progress.

The six-axis sensor 66 is an acceleration sensor, and detects displacement of the user's head in XYZ directions (triaxial) and an inclination of the user's head with respect to the XYZ directions (triaxial). In the XYZ directions, a Z direction is a direction along a gravitational direction, an X direction is a direction from back to front of the user, and a Y direction is a direction from left to right of the user. Additionally, the inclination of the head is expressed by angles around the respective axes (X-axis, Y-axis, and Z-axis) in the XYZ directions. By integrating signals from the six-axis sensor 66, the displacement and the angles of the user's head from an initial position can be known.

The image display unit 20 is coupled to the control device 70 via a coupling cable 40. The coupling cable 40 is pulled from a tip of the left holding portion 23 and is detachably coupled to a conductive connector 77 provided at the control device 70 via a relay conductive connector 46. The coupling cable 40 includes a headset 30. The headset 30 includes a microphone 63, and a right earphone 32 and a left earphone 34 attached to left and right ears of the user respectively. The headset 30 is coupled to the relay conductive connector 46 and is integrated into the coupling cable 40.

Figure 2:
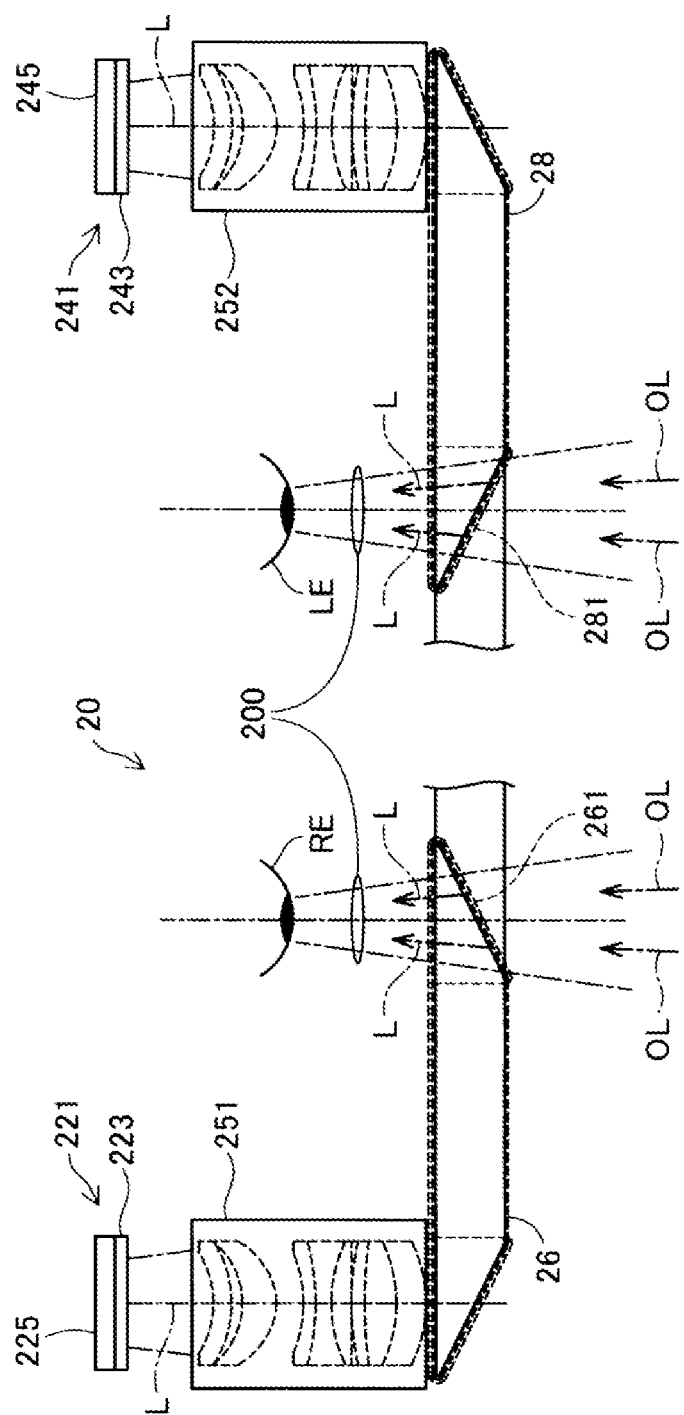
FIG. 2 is a plan view illustrating a configuration of a main part of an optical system included in an image display unit.

When a signal for displaying an image from the control device 70 is output to the image display unit 20 via the coupling cable 40, the image display unit 20 forms an image using the right display unit 22 and the left display unit 24. An optical configuration for causing the user to recognize an image will be described. FIG. 2 is a plan view illustrating a main part of a configuration of an optical system included in the image display unit 20. For convenience of description, FIG. 2 illustrates the right eye RE and left eye LE of the user. As illustrated, the right display unit 22 and the left display unit 24 are arranged symmetrically on the right- and left-hand sides.

To allow the right eye RE to view a virtual image, the right display unit 22 as a right image display unit includes an organic light emitting diode (OLED) unit 221 and a right optical system 251. The OLED unit 221 is configured to emit imaging light. The right optical system 251 includes a lens group and the like and is configured to guide, to the right light-guiding plate 26, imaging light L emitted by the OLED unit 221.

The OLED unit 221 includes an OLED panel (simply abbreviated as OLED below) 223 and an OLED driving circuit (simply abbreviated as R-CPLD below) 225 configured to drive the OLED 223. The OLED 223 is a light emission type display panel including light-emitting elements configured to emit red (R) color light, green (G) color light, and blue (B) color light, respectively, by organic electro-luminescence. The OLED 223 includes a plurality of pixels arranged in a matrix, each of the plurality of pixels including one element of R, one element of G, and one element of B.

The R-CPLD 225, in accordance with a signal transmitted form the control device 70, selects and powers light-emitting elements included in the OLED 223 to cause the light-emitting elements to emit light. The R-CPLD 225 is secured by bonding or the like, for example, onto a rear face of the OLED 223, i.e., back of a light-emitting surface. The R-CPLD 225 may include, for example, a semiconductor device configured to drive the OLED 223, and may be mounted onto a substrate secured to the rear face of the OLED 223. The OLED 223 may be configured to include light-emitting elements, arranged in a matrix, that emit white color light, and color filters, disposed over the light-emitting elements, that correspond to the R color, the G color, and the B color, respectively. The OLED 223 may have a WRGB configuration including light-emitting elements configured to emit white (W) color light, in addition to light-emitting elements configured to emit R color light, G color light, and B color light, respectively.

The right optical system 251 includes a collimate lens configured to collimate the imaging light L emitted from the OLED 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L reflected by the half mirror 261 is emitted from the right light-guiding plate 26 to the right eye RE. The imaging light L forms an image on the retina of the right eye RE to allow the user to view a virtual image.

To allow the left eye LE to view a virtual image, the left display unit 24 as a left image display unit includes an OLED unit 241 and a left optical system 252. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED 243, and an L-CPLD 245 configured to drive the OLED 243. For further details, the OLED unit 241, the OLED 243, and the L-CPLD 245 are the same as the OLED unit 221, the OLED 223, and the R-CPLD 225, respectively. Details of the left optical system 252 are the same as the right optical system 251 described above.

As described above using FIG. 2, the image display unit 20 includes the optical systems that guide the imaging light L to the right and left eyes of the user respectively, and optical systems that guide outside light OL. Thus, the optical systems that guide the imaging light L to the right and left eyes of the user respectively to cause a virtual image to be visible are simply referred to as the image display unit 200 in the following description.

According to the configuration described above, the HMD 100 may serve as a see-through type display device. That is, the imaging light L reflected by the half mirror 261 and the outside light OL passing through the right light-guiding plate 26 enter the right eye RE of the user. The imaging light L reflected by the half mirror 281 and the outside light OL passing through the left light-guiding plate 28 enter the left eye LE of the user. In this manner, the HMD 100 allows the imaging light L of the internally processed image and the outside light OL to enter the eyes of the user in an overlapped manner. As a result, the user views an external scene (real world) through the right light-guiding plate 26 and the left light-guiding plate 28 and also views a virtual image formed by the imaging light L overlapping the external scene. In other words, the image display unit 20 of the HMD 100 passes through the external scene to cause the external scene in addition to the virtual image to be visible to the user.

The half mirrors 261 and the half mirror 281 are configured to reflect imaging light output by the right display unit 22 and the left display unit 24 respectively and each extract an image. Further, the right optical system 251 and the right light-guiding plate 26 are also collectively referred to as a "right light-guiding unit" and the left optical system 252 and the left light-guiding plate 28 are also collectively referred to as a "left light-guiding unit". Configurations of the right light-guiding unit and the left light-guiding unit are not limited to the example described above, and any desired configuration may be adopted as long as imaging light forms a virtual image in front of the eyes of the user. For example, diffraction gratings or translucent reflective films may be used for the right light-guiding unit and the left light-guiding unit.

Figure 3:
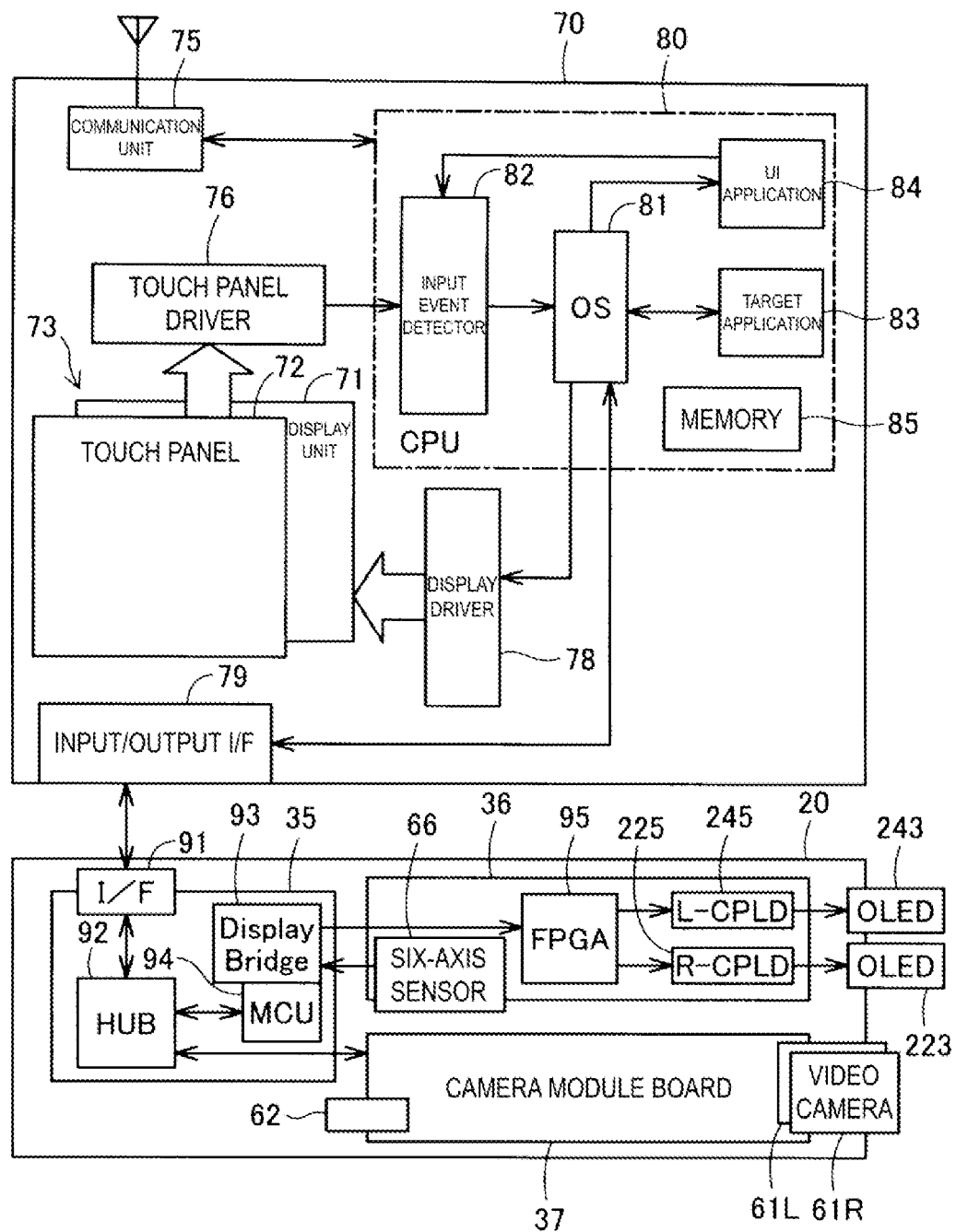
FIG. 3 is a schematic configuration diagram illustrating a configuration of a signal processing circuit of a display device.

A-2. Configuration of Control Device 70:

Next, a configuration of the control device 70 that outputs various signals to the image display unit 20 will be described. FIG. 3 is a block diagram illustrating an internal configuration of the control device 70 and the image display unit 20. In addition to the display 73 described above, the control device 70 includes a communication unit 75, a CPU 80, a touch panel driver 76, a display driver 78, an input/output interface (hereinafter abbreviated as an input/output I/F) 79, and the like. Note that, drive power of 70 is supplied to each unit from a battery (not illustrated).

The display 73 includes a display unit 71 that displays an image in full color, and a touch panel 72 that, when the user touches the display unit 71 by a fingertip or the like, detects a position and strength of the touch. The display unit 71 is driven by a display driver 78 that receives a signal from the CPU 80. In addition, the touch panel 72 is coupled to the touch panel driver 76, receives a drive signal from the touch panel driver 76 to dynamically detect the touch position in the display 73, and outputs the detected touch position and strength to the CPU 80 via the touch panel driver 76.

The communication unit 75 communicates with a mobile terminal 110 and receives image signals including an image or a voice. An arbitrary communication scheme may be adopted such as WiFi (trademark) or Bluetooth (trademark). Further, an image signal may be received from the mobile terminal 110 via a wire. Note that, the HMD 100 need not have a function of interacting with the mobile terminal 110. The input/output I/F 79 provided in the control device 70 is capable of inputting and outputting data through a connector shape conforming to so-called Type-C standards and serial communication.

The CPU 80 that governs each of these units includes a memory 85 therein, and executes a program stored in the memory 85 to implement functions such as an operating system (hereinafter simply abbreviated as an OS) 81, and an input event detector 82. The OS 81 used in the present exemplary embodiment has the same basic functions as those of universal OSs used in the mobile terminal 110 and the like. A difference is that a function of imaging an external scene using the video cameras 61R and 61L, a function of detecting a line-of-sight using the inner camera 62, a function of displaying an image on the display 73 along with the image display unit 200, and the like are enhanced. Accordingly, application programs created for the OS 81 can be executed by the control device 70 as is or with slight modifications. Examples of such application programs include games, application programs that perform various work supports, and the like. These are referred to as target applications 83. In addition, in the present exemplary embodiment, separate from the target applications 83, a user interface supporting application program (hereinafter simply referred to as a UI application) 84 that provides various input methods can be performed concurrently with the target application 83.

The CPU 80 outputs an image caused to be displayed by the image display unit 200 via the input/output I/F 79 to the image display unit 20 under control of the OS 81. In conjunction with the input and output of such image signal, the CPU 80 handles the display 73 as an input unit, and causes the display unit 71 to display images such as buttons, keys, and fields necessary for input, via the display driver 78, and inputs a position and strength of a touch by the user on the touch panel 72 in accordance with the display, via the touch panel driver 76. The position and the strength of the touch detected by the touch panel driver 76 are input to the input event detector 82, checked against a state of a user interface for input received from the UI application 84, interpreted by the OS 81, and output to the target application 83.

When the target application 83 is a drawing application program for performing drawing, the CPU 80 executes the program to function as an extraction unit that extracts a region of a color of an operation object (e.g., a hand or the like) for drawing, a drawing mode change unit that changes a drawing mode of the operating object, and a control unit that controls image display in the image display unit 200. Functions of each of these units when the drawing application program operates will be described in detail below.

As illustrated in the bottom of FIG. 3, the image display unit 20 is mainly constituted by a basic board 35, an optical module board 36, and a camera module board 37. The basic board 35 is mounted with an interface unit (hereinafter simply referred to as an I/F unit) 91 that exchanges image signals to and from the input/output I/F 79 of the control device 70, a HUB 92 that separates signals and mediates the signals between the I/F unit 91 and the HUB 92, an MCU 94 that takes in one of the signals from the HUB 92 to operate, a display bridge 93 that processes image signals by processing by the MCU 94, and outputs the signals to the optical module board 36.

Another signal line from the HUB 92 is coupled to camera module board 37 and is used to output image signals from the video cameras 61R and 61L and the inner camera 62 mounted to camera module board 37, to the control device 70 via the HUB 92 and the I/F unit 91. The CPU 80 can also perform processing such as analyzing images from the video cameras 61R and 61L, and acquiring information necessary for drawing.

The optical module board 36 is mounted with an FPGA 95, the above-described R-CPLD 225, L-CPLD 245, and the six-axis sensor 66. The FPGA 95 is coupled to the display bridge 93 of the basic board 35, separates image signals received from the display bridge 93 into image signals for the right and left eyes respectively, and further converts the signals into RGB signals. The R-CPLD 225 and the L-CPLD 245 drive the OLEDs 223 and 243 respectively in accordance with the signals from the FPGA 95. The six-axis sensor 66 is coupled to the display bridge 93 on the basic board 35, and outputs posture of 20 (triaxial), and acceleration in each axial direction (triaxial).

In the three axes indicating the posture, a gravitational direction is a Z-axis direction (vertical direction), a direction that is orthogonal to the Z-axis direction, and is a direction form the right eye to the left eye in a state in which the image display unit 20 is worn by the user (FIG. 1) is a Y-axis direction (left-right direction), and a direction orthogonal to the Z-axis and the Y-axis is an X-axis direction (front-back direction). Of course, a human head, due to structure of a skeleton, easily takes four types of posture, that is, rightward rotational posture in which the head rotates approximately about the Z-axis toward a right eye side (arrow RT side in FIG. 1), leftward rotational posture in which the head similarly rotates toward a left eye side (arrow LT side in FIG. 1), upward rotational posture in which the head rotates toward an upper side (arrow UP side in FIG. 1), and downward rotational posture in which the head rotates toward a lower side (arrow DW side in FIG. 1), thus the image display unit 20 may be configured to process signals from the six-axis sensor 66 on a side of the image display unit 20, and output the signals as the four types of posture described above. The acceleration is acceleration in each of the axial directions X, Y, and Z.

Figure 4:
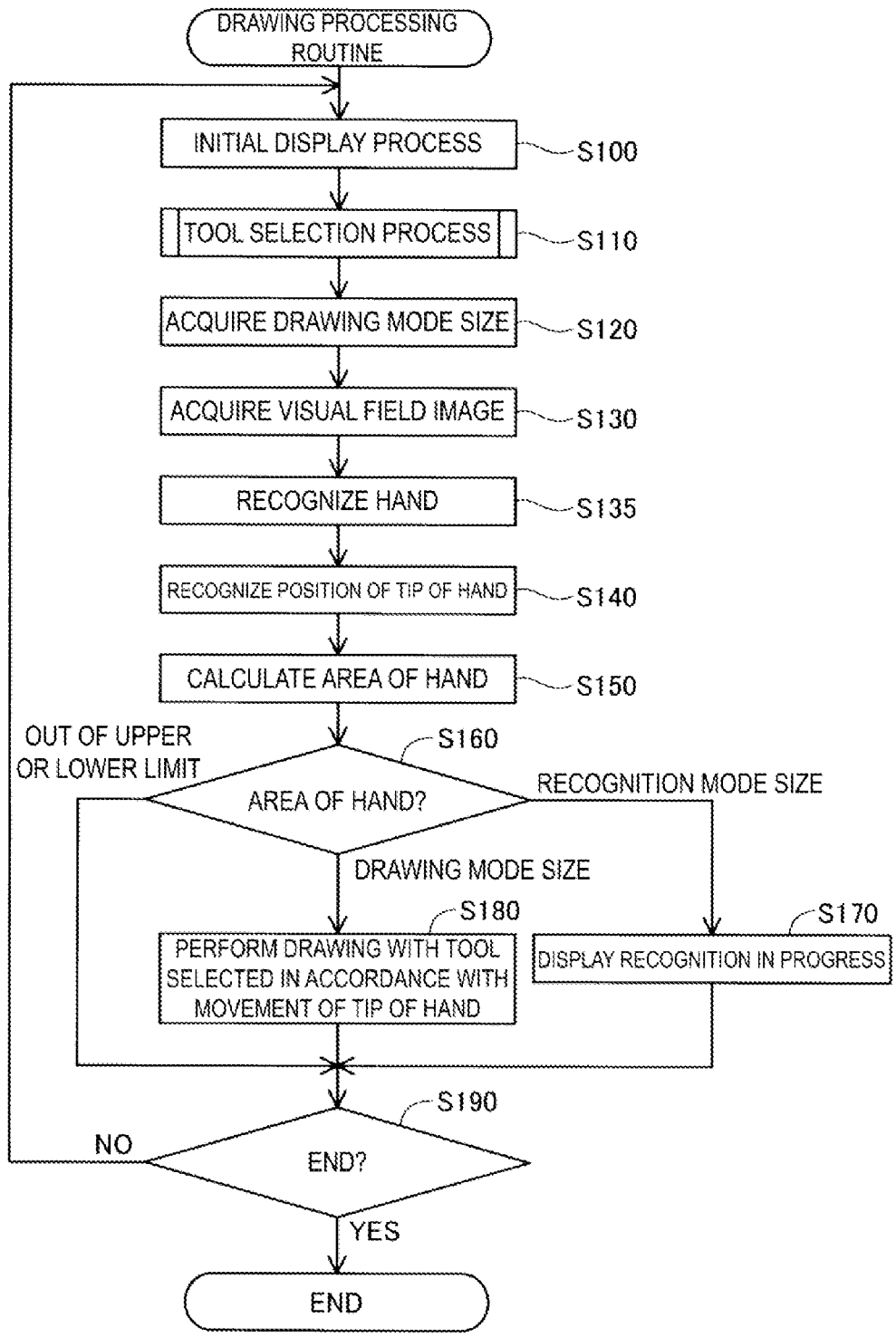
FIG. 4 is a flowchart illustrating a drawing processing routine performed by a control device in a first exemplary embodiment.

A-3. Aspect of Drawing:

The user can view the image display unit 200 and perform drawing, while wearing the HMD 100 on the head. This approach is described with reference to a flowchart illustrated in FIG. 4. The user first taps one of icons of an application program displayed on the display 73 of the control device 70 to start the target application 83 for drawing. When the target application 83 for drawing is started, processing illustrated in FIG. 4 is started, and an initial display process is first performed (step S100). The initial display process is a process for performing an initial display for drawing.

Figure 5A:
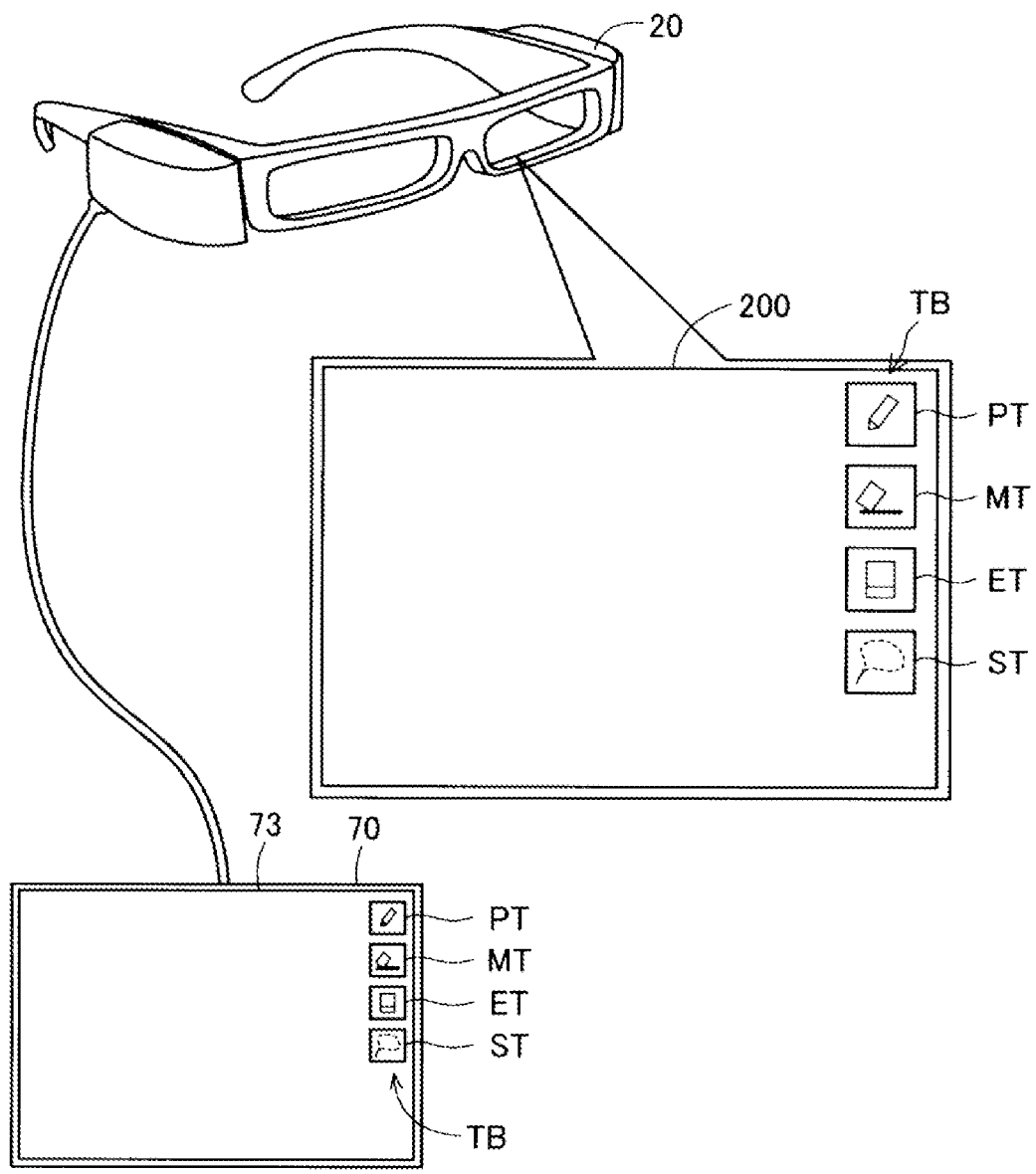
FIG. 5A is an explanatory diagram illustrating an example of an initial display.

In the present exemplary embodiment, the initial display process displays a tool bar TB including icons for tools for drawing on the image display unit 200, as illustrated in FIG. 5A. In this example, as the tools for drawing, icons corresponding to a pen tool PT, a marker MT, an eraser rubber ET, and a lasso ST respectively are displayed. The user then selects a tool first. This is a tool selection process (step S110).

Figure 5B:
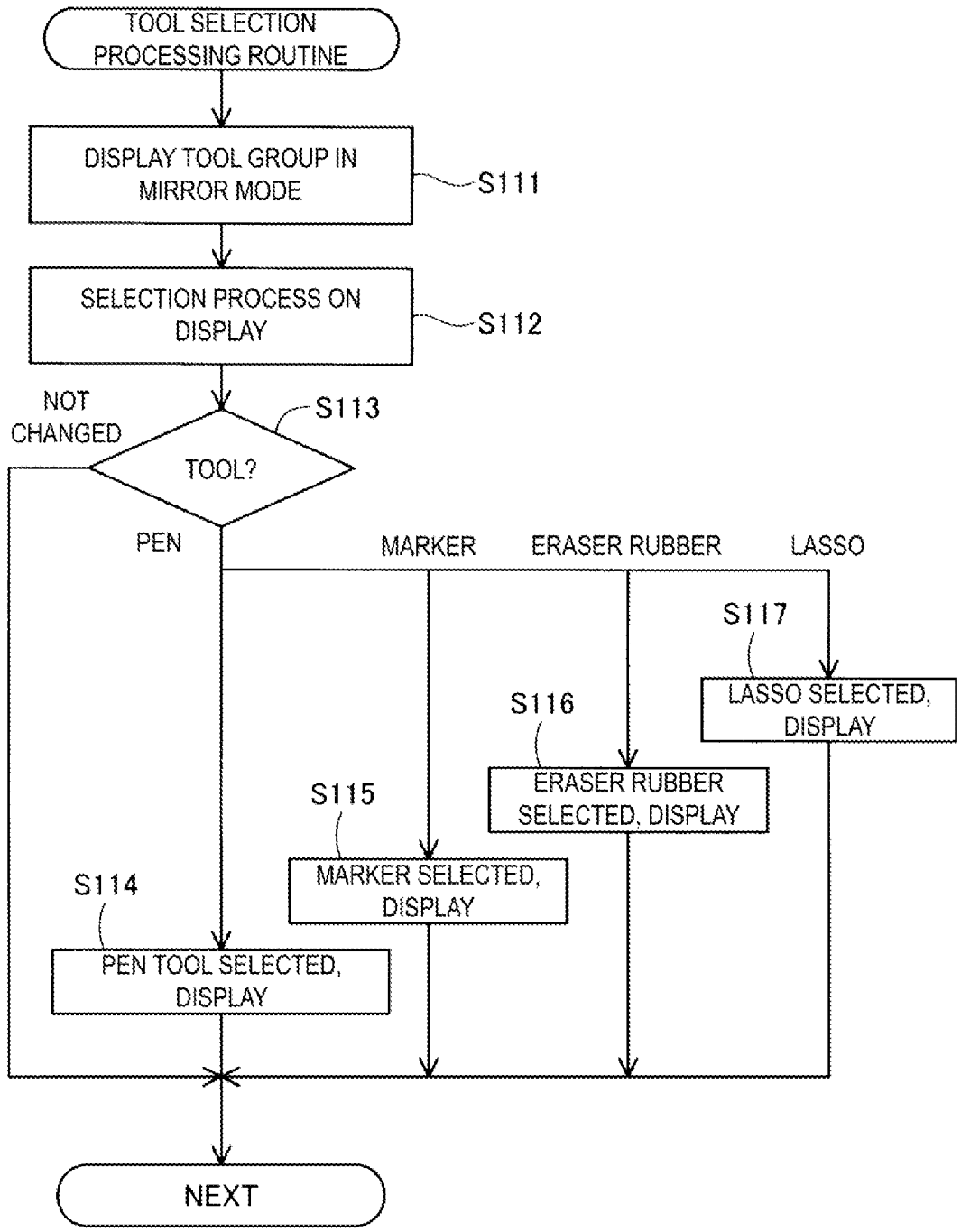
FIG. 5B is a flowchart illustrating a tool selection processing routine.

Details of the tool selection process (step S110) are illustrated in FIG. 5B. When the tool selection process is started, an input mode is first set to a mirror mode, that is, a mode in which the same one is displayed on the image display unit 200 and the display 73. Thus, similar to the image display unit 200, the tool bar TB including the icons of the various tools is also displayed on the display 73. The user then performs a process for selecting one of the tools on the display 73 (step S112). Since the display 73 is provided with the touch panel 72, the target application 83 can recognize which tool icon the user selects via the event detector 82 and the UI application 84. Note that, as for the tool, by default, a particular tool such as the pen tool PT may be in a selected state. Furthermore, the tool displayed on the tool bar TB may be only the pen tool, and in this case, a selection process (step S120) need not performed. The tool bar TB may include other tools such as a filling tool, and a tool for drawing straight lines, circles, polygonal shapes, and the like as vector data. Of course, the selection of the tool is not limited to selection by the tool bar TB, and various techniques can be employed, such as a method of perform selection from a pop-up menu or a pull-down menu. Alternatively, voice recognition may be utilized to select the tool.

When the user touches the display 73 and selects any of the tools, the selected tool is determined (step S113), and when the selected icon is for the pen tool PT, the pen tool PT is selected and displayed (step S114). When the pen tool PT is selected, the icon PT for the pen tool in the tool bar TB is inverted to black to display that the icon PT is in a selected state. In addition, the pen tool PT is displayed on the image display unit 200 with a contour line (see FIG. 6).

Similarly, in the determination for the selected tool (step S113), when the selected icon is for the marker MT, the marker MT is selected and displayed (step S115). When the marker MT is selected, the icon MT for the marker in the tool bar TB is inverted to black to display that the icon MT is in a selected state. Further, the marker MT (not illustrated) is displayed on the image display unit 200. Similarly, in the determination for the selected tool (step S113), when the selected icon is for the eraser rubber ET, the eraser rubber ET is selected and displayed (step S116). When the eraser rubber ET is selected, the eraser ET of the eraser rubber in the tool bar TB is inverted to black to display that the eraser rubber is in a selected state. Further, the eraser rubber ET is displayed in the image display unit 200 (not illustrated).

After these processes, or when it is determined that the tool is not changed in the determination of step S113, the processing proceeds to "NEXT" and the tool selection process ends, and the processing proceeds to step S120 in FIG. 4 to acquire a drawing mode size. The drawing mode size is a size for determining whether a size of an operating object is a size that can be handled as a drawing mode or not. In the present exemplary embodiment, an area of the hand of the user is used as the operating object. The area of the hand is determined by a size of a portion in a color of the hand. A method of determining a size of a portion in a color predetermined as the color of the hand and the like will be described in detail below. The drawing mode size used at that time will also be described together.

Figure 5C:
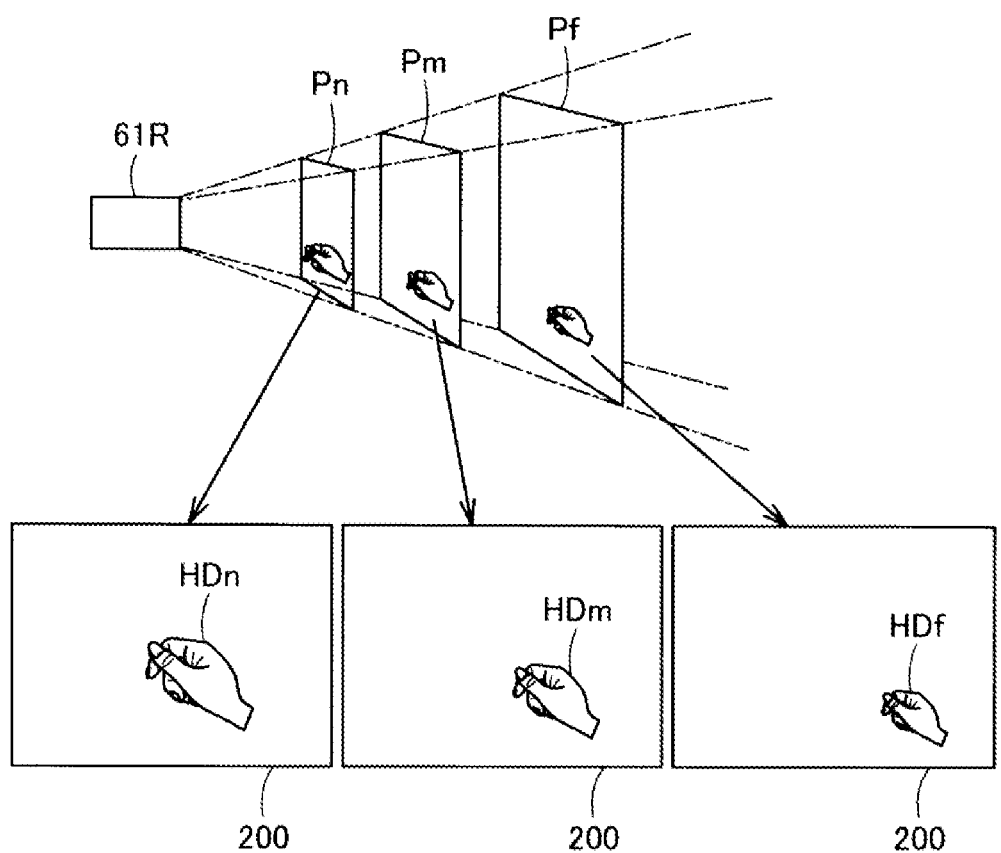
FIG. 5C is an explanatory diagram illustrating a state in which a visible size varies depending on distance.

Next, a process for acquiring a visual field image is performed (step S130). The visual field image is an image imaged by the video cameras 61R and 61L, and is an image assumed to be a visual field of the user. The visual field image may be an image obtained by combining images of the respective two video cameras 61R and 61L, or may be an image of one of the two video cameras 61R and 61L. An image of imaging a visual field image by the video camera 61R is illustrated in FIG. 5C. The video camera 61R includes a so-called non-focal lens, and regardless of a distance from the video camera 61R, can image a focused image, for a certain range. Of course, an auto-focus function may be provided, to focus on the hand as the operating object. In FIG. 5C, a state of a size of the hand in a captured image when a spacing distance between the right hand of the user and the video camera 61R varies is illustrated by three images of an image Pn nearest to the video camera 61R, an image Pf farthest from the video camera 61R, and an image Pm in the middle of the two. As illustrated, an actual size of the hand of the user is the same at all the position, but since an imaging range by the video camera 61R widens as a distance from the video camera 61R increases, a size of the imaged hand relatively decreases. Thus, in the image Pn imaged at the position nearest to the video camera 61R, an image HDn of the hand is the largest, and in the farthest image Pf, an image HDf of the hand is the smallest, and in the image Pm in the middle of the two, an image HDm of the hand has a medium size in the middle of the two.

After acquiring the visual field image, a process is performed to recognize the hand in the acquired image (step S135). The hand may be thought of as a set of pixels that have a color, as a so-called color of skin, and are in a predetermined color range. Thus, it is easy to extract that the hand is present in the captured image, by recognizing continuous pixels that fall within a range of RGB values specified in advance as a range of colors of the skin. Of course, the range of colors of the skin includes personal differences, thus which color range is defined as the range of colors of the skin may be adjustable. When there are two or more regions in each of which pixels having the RGB values defined as corresponding to the color of the skin are continuous, a largest region thereof is recognized as the hand. Furthermore, when an area of the recognized region is small, such as several pixels or less, recognition of presence of the hand is not performed.

When the hand can be recognized from the acquired visual field image, a process is performed to recognize a tip position of the hand (step S140). Various approaches have been proposed to recognize the tip position of the hand, however, for example, a center of gravity of a region that falls within a predetermined range of RGB values may be determined, and a position that is a most distant from the center of gravity may be recognized as the tip of the hand. Also, upper left of the region that is recognized as a region of a color of the hand may simply be recognized as the tip of the hand. In view of a difference in tip position depending on handedness, upper left or lower left, or upper right or lower right may be handled as a candidate for the tip, and which position is recognized as the tip of the hand may be set by the user. Alternatively, a sticker in a predetermined color may be affixed to the tip of the hand, and the sticker may be recognized as the tip of the hand. When the hand is not recognized, recognition of the tip of the hand is of course not performed.

Figures 6, 7:
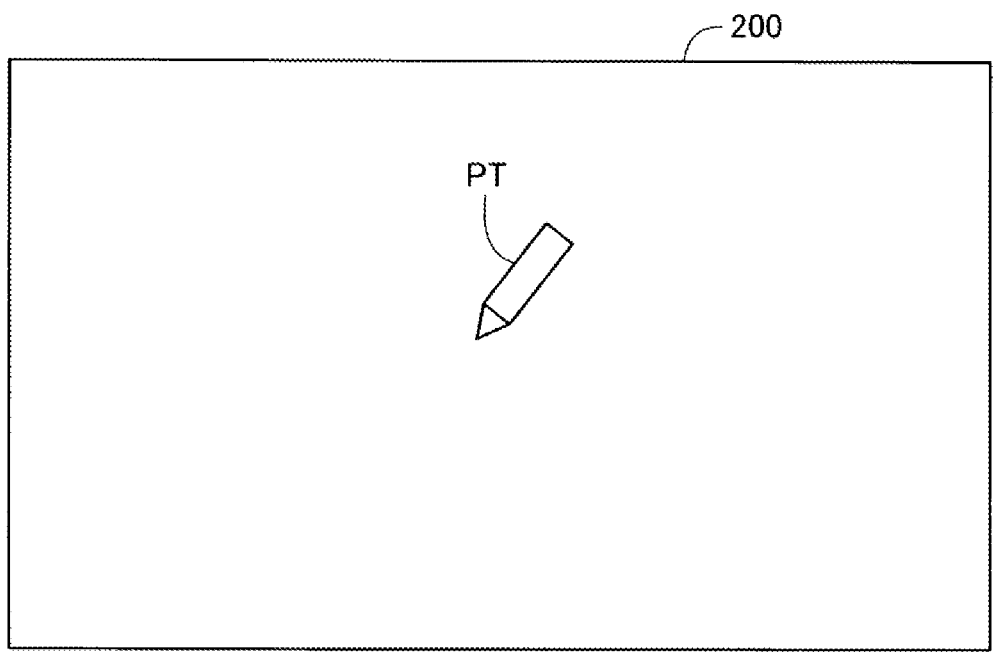
FIG. 6 is an explanatory diagram illustrating a display example of a drawing tool when an operating object is not recognized.
FIG. 7 is an explanatory diagram illustrating an example of a drawing mode size.

Once the tip of the hand is recognized, then an area of the hand is calculated (step S150). Here, the area of the hand is determined by counting the number of pixels in the region recognized as hand in step S135. However, instead of the number of pixels, the area of the hand may be determined as an area on the image display unit 200. After determining the area of the hand, how this area has a relationship with the drawing mode size previously acquired (step S120) is determined (step S160). An example of the drawing mode sizes acquired in step S120 is illustrated in FIG. 7. The numerical values illustrated correspond to the number of pixels. The drawing mode sizes are divided by a user's shape (size) into three stages of "S", "M", and "L". The size "S" indicates a smaller user, and a height less than 155 cm of females and children in the real world is assumed for the size "S". The size "M" indicates a commonly sized user, and similarly, a height from 155 cm to 175 cm of males of average height and weight or large females is assumed for the size "M". The size "L" indicates a larger user and similarly, a height greater than 175 cm of large males is assumed for the size "L". Note that, in this example, the three stages of "S", "M", and "L" are assumed as the size of the user for which the size of the user's hand is determined, but the sizes may be further divided. Alternatively, users may be limited, and only one size or two sizes may be prepared. The mode size indicates a range for determining whether the hand of the user falls within a distance at which drawing can be performed or not.

In the present exemplary embodiment, three criteria, that is, a recognizing mode 1, a drawing mode range, and a recognizing mode 2, for the respective sizes are prepared. Of these, the drawing mode range is, a range in which the hand is handled as the drawing mode when the size of the hand is within this range, that is, a first range. On the other hand, the recognizing mode 1 is a range in which the area of the hand is less than the drawing mode range, the hand is recognized, but the hand is not handled as the drawing mode. Further, the recognizing mode 2 is a range in which the area of the hand is greater than the drawing mode range, the hand is recognized, but the hand is not handled as the drawing mode. The recognizing mode 1 and the recognizing mode 2 are collectively referred to as a recognition mode.

When the area of the hand determined in step S150 is less than a lower limit of the recognizing mode 1 or greater than an upper limit value of the recognizing mode 2, a position of the hand of the user does not reach a position at which drawing is possible or a vicinity of a position at which drawing is possible, thus nothing is done, and the processing proceeds to step S190. In step S190, it is determined whether end of the drawing process is instructed, and when not, the processing returns to step S100 to repeat the processes described above.

Figure 8:
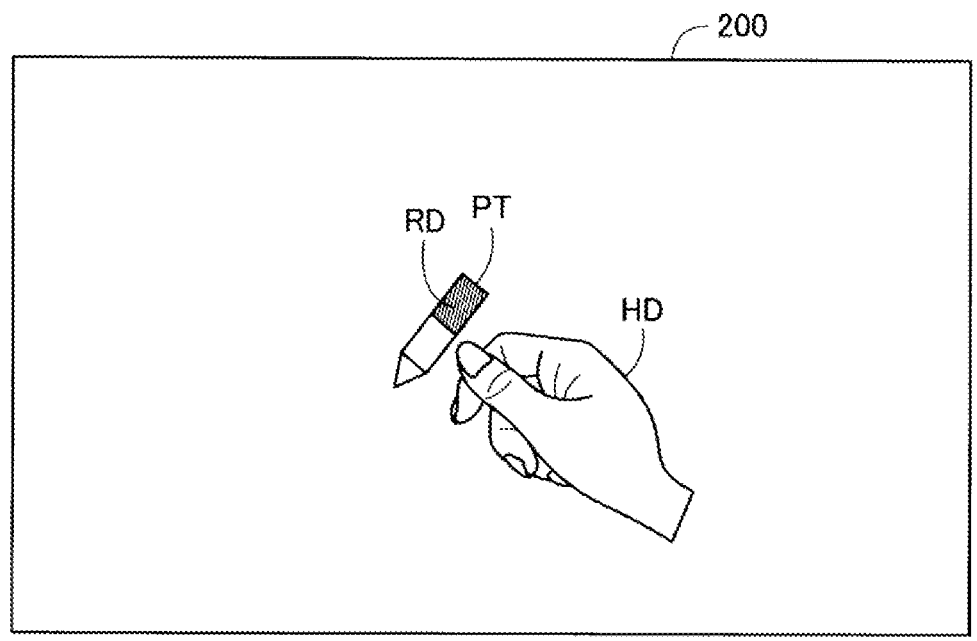
FIG. 8 is an explanatory diagram illustrating a display example of the drawing tool when a recognized size of the operating object is a size in a recognizing mode 2.

In step S160, when it is determined that the recognized area of the hand falls within the range of recognition mode set for the user (FIG. 7), display for indicating that recognition is in progress is performed (step S170). An example of the display for indicating that recognition is in progress is illustrated in FIG. 8. In this example, of an inside of the pen tool PT, selected by the selection process in step S110 and indicated by the contour line, only a region RD corresponding to a size of a recognized hand HD is filled. The pen tool PT is also displayed near the user's hand HD, and at a position that does not overlap with the hand HD. In this example, it is determined that the user is a right-hander from a shape of the hand HD, and the pen tool PT is drawn such that a pen tip is in a lower left direction in the image display unit 200, and is drawn on a left side of the hand HD. In this way, unpleasantness of drawing using the virtual pen tool PT can be reduced, and feeling of drawing by a real pen can be approached. Note that, in the example illustrated in FIG. 8, the fact that the area of the hand HD is in the range of the recognition mode is indicated by partially filling the inside of the pen tool PT indicated by the contour line, but, of course, other approaches may be adopted such as, changing a color and a line type of the contour line of the pen tool PT, blinking the tool, changing the shape, displaying text such as "recognizing", or further presenting that the processing is in the recognizing mode and not in the drawing mode by a voice.

Figure 9:
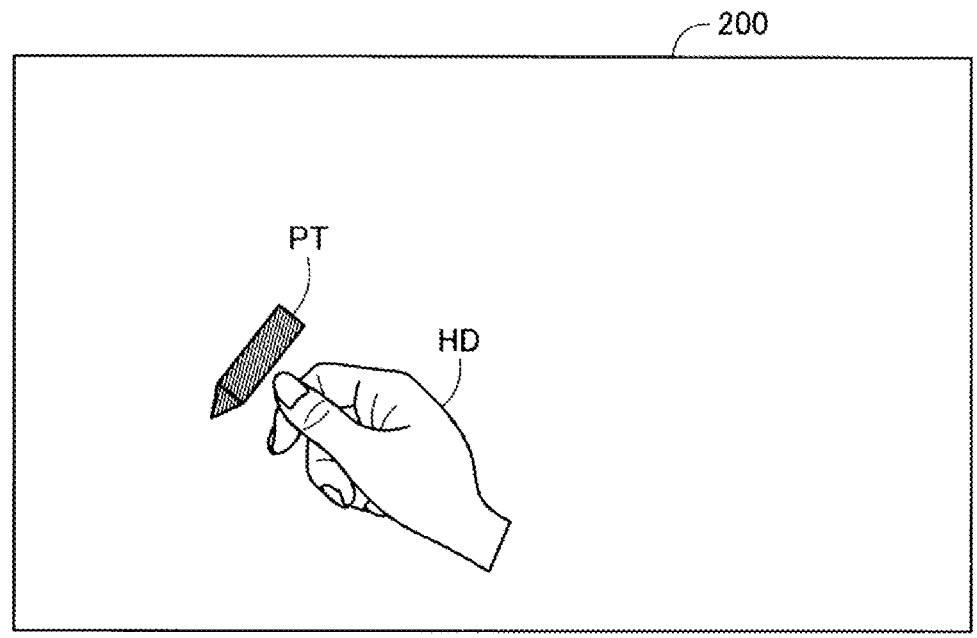
FIG. 9 is an explanatory diagram illustrating a display example of the drawing tool when the recognized size of the operating object is a size in a drawing mode.
Figure 10:
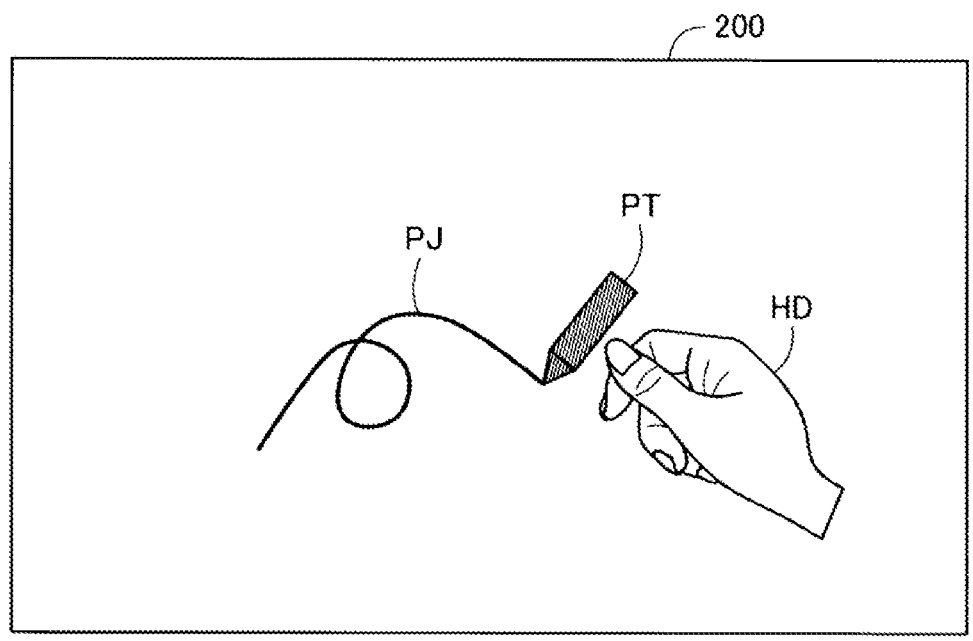
FIG. 10 is an explanatory diagram illustrating a state of drawing using the operating object.

When it is determined in step S160 that the recognized area of the hand falls within the drawing mode size set for the user (FIG. 7), display is performed that the processing is in the mode for performing drawing, and the drawing is processed (step S180). Specifically, as illustrated in FIG. 9, the inside of the pen tool PT is entirely filled. The pen tool PT is also displayed near the user's hand HD, and at a position that does not overlap with the hand HD. In this state, as the user moves his/her hand, motion of the recognized tip of the hand is recognized by the video camera 61R, and in response to the movement, the pen tool PT is moved, and a line PJ is drawn along a trajectory of the tip of the pen tool PT in the image display unit 200. This is illustrated in FIG. 10. The drawn image may be handled as bitmap data, or may be handled as vector data such as a Bezier curve or a spline curve. The data is stored in the memory 85 as appropriate.

Of the processes described above, the process in step S150 corresponds to the extraction unit that extracts the operating object as the region of the color of the operating object from the captured image, and step S160 and the subsequent processes (steps S170 and S180) correspond to the drawing mode change unit that changes the drawing mode by the operating target, here the hand, in accordance with the size of the extracted region of the color. Note that, in this example, in the drawing modes which are changed according to the area in the color of the hand, two states of a state of at least actually drawing a line (drawing mode) and a state close to the drawing mode (recognizing mode) are distinguished, but three or more modes may be prepared and the modes may be changed. As the three or more modes, various drawing modes, such as, for example, a mode for drawing a temporary drawing line, a mode for erasing a drawn line, and the like can be assumed.

In the example illustrated in FIG. 9 and FIG. 10, the fact that the area of the hand HD is the drawing mode size is illustrated by entirely filling the inside of the pen tool PT indicated by the contour line, but of course, other approaches may be used such as, changing a color and a line type of the contour line of the pen tool PT, blinking the tool, changing a shape, displaying text such as "during drawing", and additionally, presenting with a voice that the processing is in the drawing mode.

Figure 11:
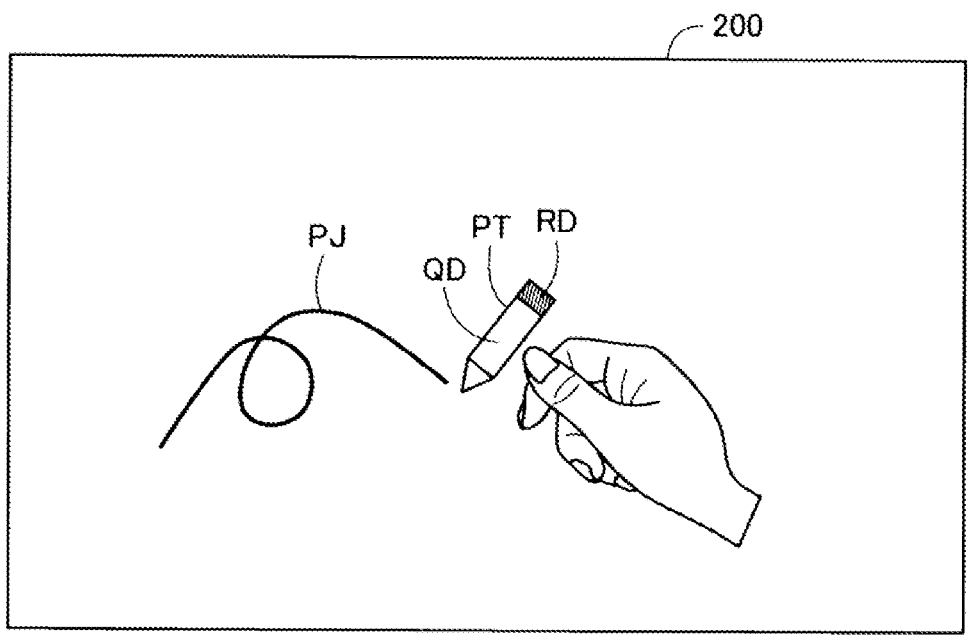
FIG. 11 is an explanatory diagram illustrating a display example when the recognized size of the operating object is a size 2 in the recognizing mode during drawing.

When the area of the hand HD falls within the drawing mode size in this way, the pen tool PT is displayed as a filled image, and the processing is switched to the drawing mode for performing drawing in accordance with the movement of the hand HD. When, while continuing drawing, the user moves the position of hand HD too close to the user (recognizing mode 2), or the too far from the user (recognizing mode 1), the determination in step S160 is changed, and as illustrated in FIG. 11, the display of the pen tool PT is changed to a partially filled image, and the drawing in accordance with the movement of the fingertip is also stopped. In the case of the display of the partially filled pen tool PT, a range to be filled may be varied depending on a degree of a difference of the detected area of the hand HD with respect to the drawing mode size. In other words, in the recognition mode corresponding to a second mode, the size of the region of the color of the hand as the operating object is recognized in a plurality of stages depending on a degree of a difference from the first range as the drawing mode size, and display of a second aspect in the second mode is performed, that is, the range of the filled tool is displayed differently depending on the stage at which recognition is performed. The stages may be set such that the area to be filled is changed by 10%, for example every time the number of pixels varies by 10%. Of course, the number of stages may be two or so.

Thus, when the user's hand HD enters the field of view of the user wearing the image display 20 on the head, a distance from the image display unit 20 to the hand HD is recognized by recognizing the size of the hand HD in the image display unit 200, and when the distance to the hand HD is within a distance range of the recognition mode, image display is performed in a state where the pen tool PT is partially filled, and when the area of the hand HD falls within the drawing mode size, the image display is changed to a state where all of the pen tool PT is filled, and the drawing is performed in accordance with the movement of the hand HD. Since a process for determining an area of a hand when a color of skin is within a predetermined color range is simple as image processing, a load on a computer performing the image processing can be reduced, and the area can be quickly determined, the distance to the hand HD can be known and the drawing mode can be switched.

In the exemplary embodiment described above, the drawing mode is changed by the size of the region of the color of the hand as the operating object, and when the hand is pulled to a side of the user or toward the user in the state where the processing is in the drawing mode, the drawing mode is changed to the recognizing mode. This is similar to movement when drawing is performed on a desk with a pencil, pen, marker, or the like. Thus, it is easy to intuitively understand how to change the drawing mode. In the exemplary embodiment described above, outside the drawing mode range illustrated in FIG. 7, the "recognizing mode 1" in which the hand moves away from the video camera and "recognizing mode 2" in which the hand approaches the video camera are similarly treated as modes in which the drawing is not performed, but the two recognizing modes may be treated differently in association with the distance from the desk, for example, the recognizing mode 2 may be treated as a non-drawing mode assuming that the tool is separated from the desk, and the recognizing mode 1 may be treated as a drawing mode in which the pen tip is increased or a mode in which the eraser rubber erases a wide range, assuming that the tool is strongly pressed on the desk.

In the above-described exemplary embodiment, the HMD 100 includes the display 73 not only in the image display unit 20 but also in the control device 70, but drawing can be performed by using only the image display unit 20, without using a mirror mode for displaying the same image as that in the image display unit 20 on the display 73, or the like. For this reason, the user can perform drawing in natural posture and in a natural visual field without frequently looking at the control device 70. Of course, it is also possible to configure the HMD 100 without the display 73. In this case, it is sufficient that the tool bar TB illustrated in FIG. 5A is also selected on a side of the image display unit 20. The selection of each icon displayed on the tool bar TB may be performed by, as in the case of the drawing, distinguishing between a "selected state" and an "unselected state" by the region of the color of the hand. Of course, an icon may be selected by the gesture known in the past.

Furthermore, the control device 70 itself may be mounted on the side of the image display unit 20 and integrated. In this case, a battery and the like can be shared. In the case of integration, an embodiment may be adopted that is not limited to a glasses type, and is mounted on the head by a belt or the like in order to control balance when mounted on the head. Furthermore, coupling between the control device 70 and the image display unit 20 may be performed via wireless communication. In this case, a weight of the device mounted on the head can be reduced. Furthermore, the HMD 100 of the above-described exemplary embodiment can be used, for example, as a display device of a personal computer, but may be configured to be able to implement, by itself, a function as a computer in which an application program such as a word processor, a spreadsheet, a drawing rendering, or the like is executed. Specifically, a high-speed CPU, a storage device such as an SSD, a DPS, or the like may be mounted. In the HMD 100 in which such a function can be implemented, switching of the drawing mode by the size of the region of the color of the operating object described above as an input/output means can be used, as an input method that is flexible and easily implemented. For example, the switching can be used for selection of a cell in a spreadsheet program, selection of a word in a word processor, and the like. Such switching of selection and deselection also corresponds to a change of the drawing mode in a broad sense. Of course, how much of functions are assigned to which of the computer on which application programs are performed and a display device such as an HMD is arbitrarily determined. It is sufficient that the assignment is determined in consideration of various requirements such as size, weight, and heat generation of available devices.

B. Second Exemplary Embodiment

Figure 12:
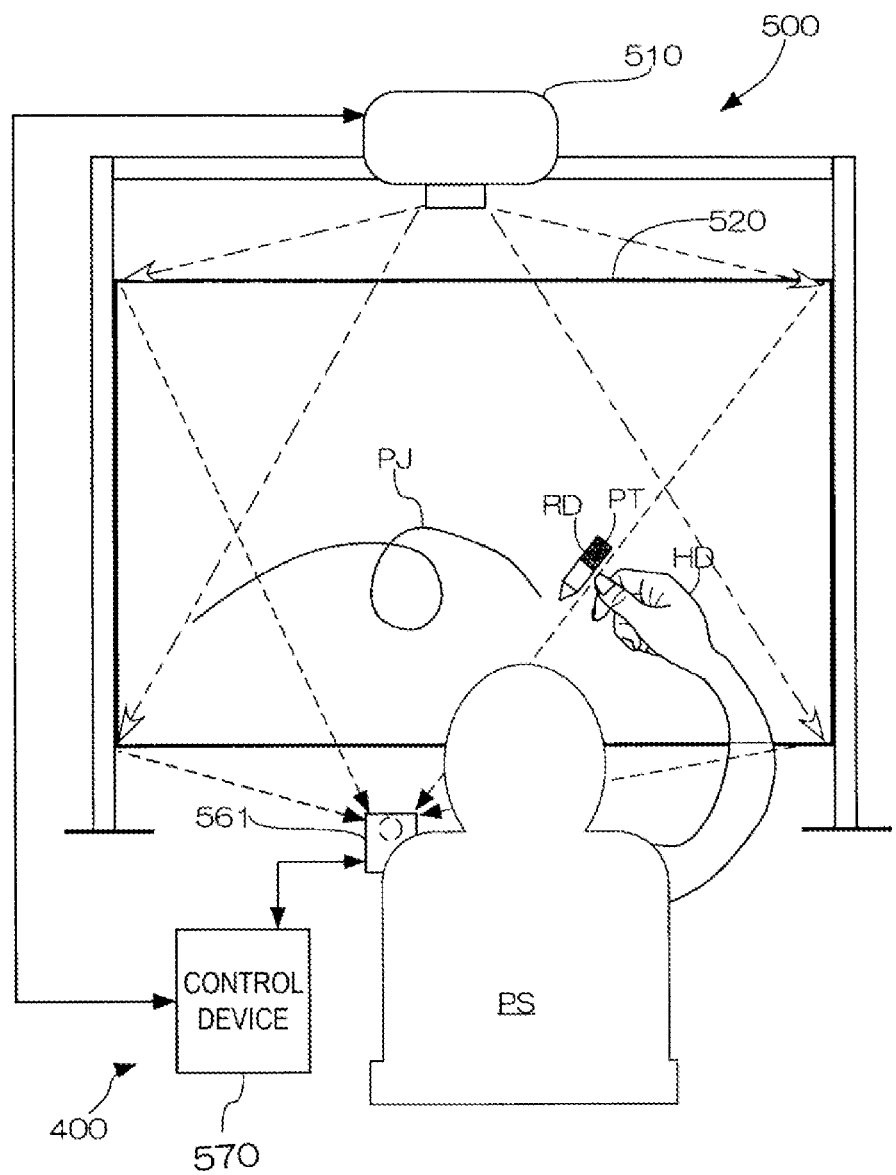
FIG. 12 is a schematic configuration diagram of a second exemplary embodiment.

Below, an image display system 400 according to a second exemplary embodiment will be described. As illustrated in FIG. 12, the image display system 400 includes an electronic whiteboard 500, a video camera 561, and a control device 570. The electronic whiteboard 500 includes a short focus projector 510 and a screen 520. Upon receiving an image signal from the control device 570, the electronic whiteboard 500 displays an instructed image on the screen 520 using the short focus projector 510. The electronic whiteboard 500 and the control device 570 may be coupled by wire, or may be coupled by wireless communication such as WiFi (trademark). The control device 570, similar to the first exemplary embodiment, includes a display (not illustrated). Thus, a user PS, similar to the first exemplary embodiment, can start an application program for drawing using the control device 570, and select the pen tool PT and the like. When a tool is selected, an icon for the selected tool is displayed on the screen 520 by the short focus projector 510. In the example illustrated in FIG. 12, the icon for the pen tool PT is displayed.

The video camera 561 is arranged on a side of the electronic whiteboard 500 with respect to the user PS. Specifically, the video camera 561 is mounted on a chest pocket or the like of the user PS. Of course, a stand may be used to arrange the video camera 561 as well, or the user may hang down the video camera 561 from a neck. The video camera 561 and the control device 570 are coupled wirelessly or by wire. In the video camera 561, an imaging range and angle of view are set so as to image a region of the electronic whiteboard 500 where the screen 520 is present. In FIG. 12, the hand HD of the user PS is much closer to the user PS than the screen 520 of the electronic whiteboard 500, but it is easy for the user to move the hand such that hand HD is present within a frame of the screen 520, from the video camera 561. Similarly to the first exemplary embodiment, when a region of a color of the hand HD in a range imaged by the video camera 561 is recognized, and a size is within a predetermined range, the control device 570 determines that the processing is in the recognition mode and displays an image in which a portion RD of the tool icon PT is filled on the screen 520 of the electronic whiteboard 500. In addition, when the size of the region of the color of the operating object is in a drawing mode size, the control device 570 displays an image in which a tool icon is filled on the screen 520 using the electronic whiteboard 500, and displays a line PJ in accordance with movement of the hand HD of the user PS on the screen 520 by the electronic whiteboard 500.

Since the size of the region of the color of the hand HD imaged by the video camera 561 changes due to movement of the hand HD in a front-back direction relative to the user PS, various types of image display in accordance with the size are performed as in the case of the first exemplary embodiment.

According to the second exemplary embodiment described above, the user PS can freely perform drawing using the screen 520 of the electronic whiteboard 500, simply by wearing the video camera 561 coupled to the control device 570. Further, various operations involved in the drawing can be performed as in the case of the first exemplary embodiment. Further, in the second exemplary embodiment, a drawing by the user PS can be shared with other members. In an electronic conference or the like, when each of participants wears a personal video camera 561, and performs a drawing operation toward the screen 520 of the electronic whiteboard 500, a result thereof can be shared among multiple participants. Not only performing drawing, but also erasing or replicating can be easily performed by changing tools. In an electronic conference or the like, when a plurality of the image display systems 400 are coupled by a network, while an image is shared among remotely located members, each participant can perform a drawing operation to the image and share a result thereof. It is also desirable to couple a printing apparatus such as a printer to the electronic whiteboard 500 such that a conferencing result or the like can be printed.

C. Other Exemplary Embodiments

In the exemplary embodiments described above, as control of image display, the drawing mode for drawing a line by movement of an operating object, or the like, and the mode in which drawing is not performed even when an operating object is moved have been described, however, the control of image display is not limited thereto, and exemplary embodiments are possible in which control is performed such as moving, replicating, and the like of a drawn image. In addition, in the first exemplary embodiment, the image display unit 200 in the image display unit 20 is of the type in which an external scene transmits the image display unit 200 and is visually recognizable, however, an exemplary embodiment may be adopted in which an image display unit of a non-transmitting type is employed, and an image imaged by the video camera 61R is displayed to make the external scene visible.

In the exemplary embodiments described above, whether a size of a region of a color of an operating object is the drawing mode size or the recognition mode size is expressed as a difference in display aspect of an icon for a tool employed at the time, for example, the pen tool PT, but an exemplary embodiment may be adopted in which a drawing tool and image display representing a difference in drawing mode are separated. For example, an exemplary embodiment may be adopted in which a figure such as a circle or a square is displayed near the pen tool PT, and a difference in drawing mode is displayed by image display such as whether or not an inside of the figure is filled. Of course, such image display also includes display of a drawing mode by a text.

Figure 13:
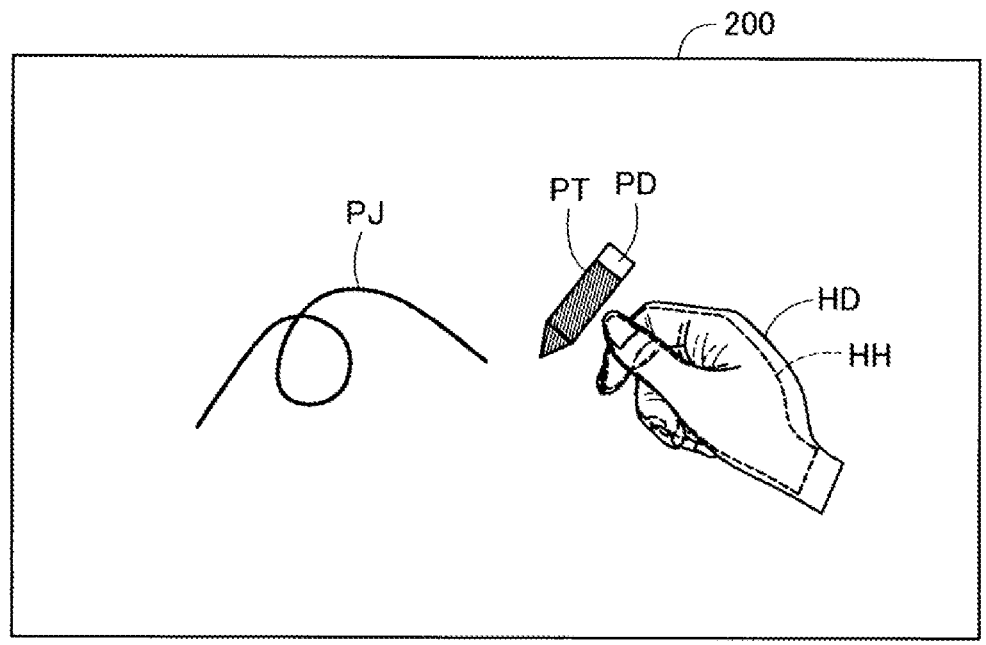
FIG. 13 is an explanatory diagram illustrating a display example when the recognized size of the operating object is a size 1 in the recognizing mode during drawing.

In the exemplary embodiments described above, by determining an area of a color range corresponding to the hand HD, a distance from the image display unit 20 to the hand is recognized, and a drawing mode is changed to change image display of a tool, but an exemplary embodiment is also possible in which when the area of the hand HD is not the drawing mode size but is the recognition mode size, as illustrated in FIG. 13, not only image display of a tool is simply changed to a partially filled tool, but the tool is superimposed on the hand HD, to display a hand image HH, which indicates a size of the hand corresponding to the drawing mode size. In this way, the user moves the hand such that the hand HD overlaps with the image HH displayed on the image display unit 200. In this case, by moving the hand away, the hand HD in a visual field becomes small, and when the hand HD overlaps with the image HH, the hand HD becomes the drawing mode size and the processing returns to the drawing mode. The displayed hand image HH is an example of image display that is controlled by the size of the hand HD.

Figure 14:
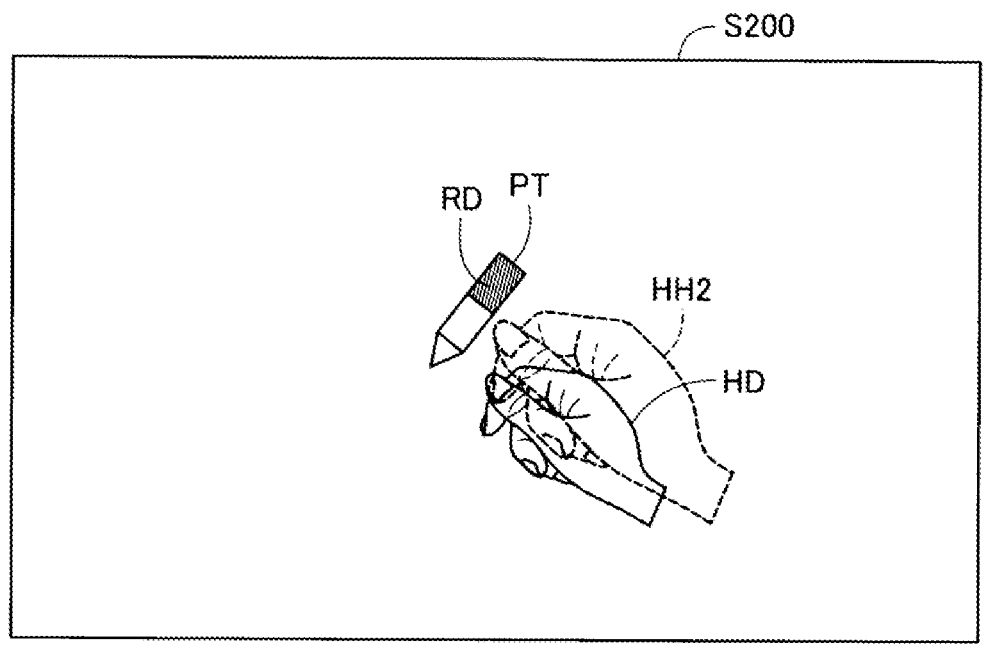
FIG. 14 is an explanatory diagram illustrating a display example of guidance when a size of the operating object deviates from the size in the drawing mode.

A similar display can also be performed when the user's hand is moved farther and becomes smaller than the drawing mode size. In this case, as illustrated in FIG. 14, a hand image HH2 as a guide display is displayed as a larger image than the user's hand that is actually visible. Instead of the guide display of the hand (image HH in FIG. 13 or image HH2 illustrated in FIG. 14), it is possible to provide a guide display function by changing image display of the tool. For example, in FIG. 13, the pen tool PT is filled from a pen tip, and a terminal end side PD of the pen tool Pt is left unfilled. On the other hand, in FIG. 14, a tip end side of the pen tool PT is left unfilled. In this way, depending on which side of the tool is left unfilled, whether the size of the hand becomes the drawing mode size when the hand is moved closer to be increased, or vice versa can be displayed. In this case, the image HH and the image HH2 need not be displayed. Also, the guide display may be performed by characters, for example, when the hand HD is small, a display such as "please bring the hand closer" may be displayed.

Figure 15:
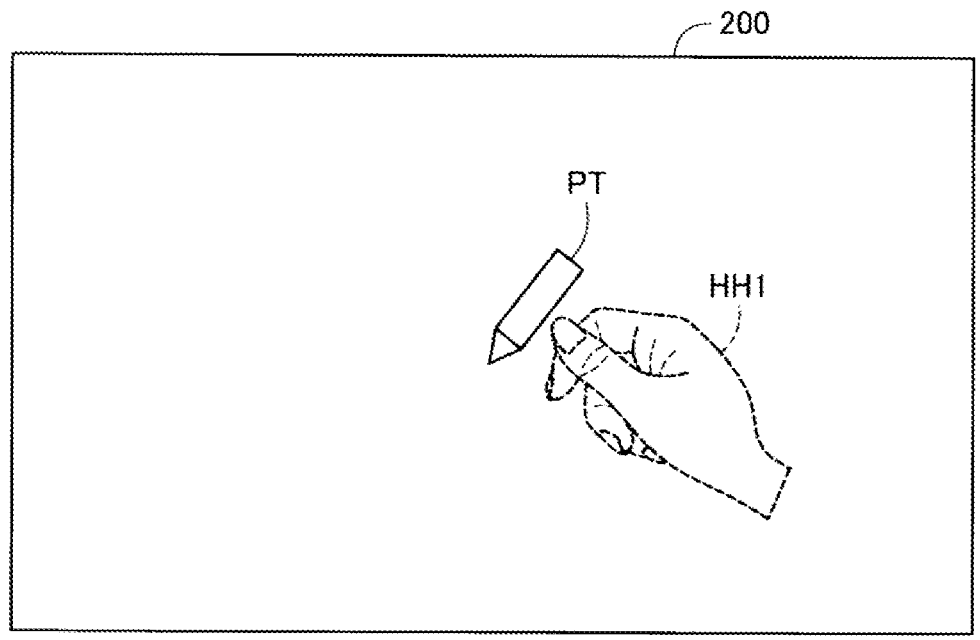
FIG. 15 is an explanatory diagram illustrating an example of display of guidance when a hand is not recognized.

Furthermore, an exemplary embodiment is possible in which when a user does not move a hand inside a field of view of the image display unit 20 for drawing, that is, when the hand is not recognizable in step S135 of FIG. 4, as illustrated in FIG. 15, the hand image HH1 is displayed and the hand of the user is guided into the visual field of the image display unit 20. Of course, a guide such as "please move the hand inside the visual field" may be performed by voice or text display instead of, or in conjunction with, the image HH1.

Figure 16:
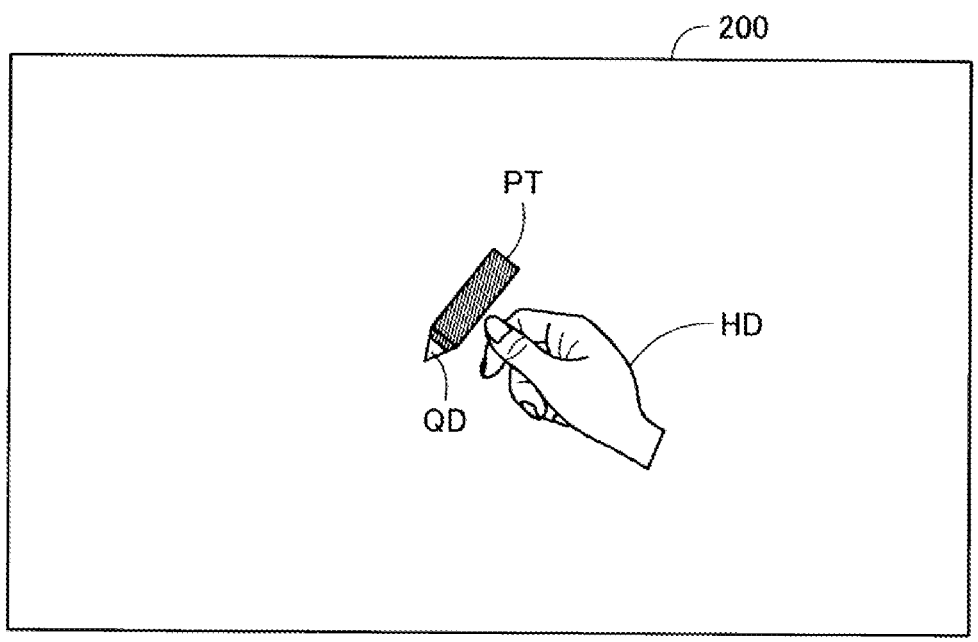
FIG. 16 is an explanatory diagram illustrating a display example when the recognized size of the operating object approaches an upper or lower limit of the drawing mode.

In addition, various types of information can be displayed by changing display of a tool used for drawing. For example, in the case of the pen tool PT, since a triangular portion of a tip and a rectangular portion that indicates a body of the tool are present, an exemplary embodiment is also possible in which when the size of the hand HD is within in the drawing mode size, the rectangular portion is entirely filled and a triangular portion QD is treated as indicating a state of a range of the drawing mode size. When the user is performing drawing in the drawing mode, movement of the hand HD may cause an area of the hand HD to approach a lower or upper limit of the drawing mode size. In such a case, as illustrated in FIG. 16, the user can be notified that the user's hand HD is too close to or too far away from the user and a size of the hand is deviating from the drawing mode size, by performing display in which filling of the triangular portion QD is partially released. Whether the upper or lower limit of the drawing mode size is approached may be notified by a position where the filling is released. Since the user can perceive whether the hand HD of the user is moving closer or farther, it is sufficient to perform display that the hand HD is likely to fall out of a range of the drawing mode size.

In the exemplary embodiment described above, as the operation by the extraction unit, the processing is performed such as recognizing the size of the hand from the area of the image in the color range that can be assumed for the color of the hand and determining the distance to the hand to change the drawing mode and change the image display of the tool, but since there is a personal difference in the color range that is assumed for the color of the hand, the color range may be pre-learned. In advance, the user's hand or the like is captured by a video camera, and a predetermined width is set to each of RGB values of a color of the acquired hand, to determine that a pixel having RGB values within the range belongs to the color range of the hand. Standard skin colors may be determined and the color range may be learned as a difference therefrom.

Figure 17:
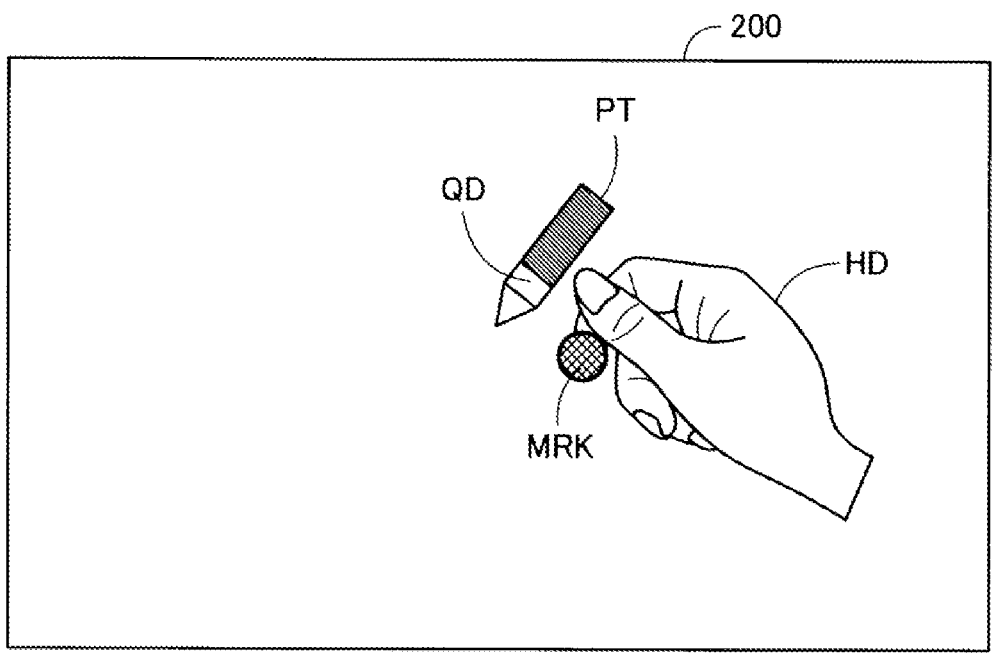
FIG. 17 is an explanatory diagram illustrating a case in which a sticker is affixed to a user's hand to cause the sticker to be recognized.

Alternatively, an exemplary embodiment may be adopted in which, instead of a hand, a user wears a glove in a particular color, and an image of this glove is used. By using the glove in the specific color, a color range used for recognition can be narrower than that of an actual color of the hand, and a boundary of the region of the color is easily clarified, thus an area of the region of the color can be accurately determined. Similarly, as illustrated in FIG. 17, an exemplary embodiment may be adopted in which a predetermined color sticker MRK is affixed to the hand HD, the color sticker is handled as an operating object, and an area thereof is determined to recognize a distance to the operating object. In this case, when a shape of the sticker is determined in advance together with the color of the sticker, the shape of the sticker can also be used for recognition of the operating object. Furthermore, a pen, rod, light, or the like in a specific color may be held as an operating object, and an area in a color of the operating object may be determined. In this way, a size of the operating object to be recognized and a size of a finger of the user becomes unrelated, and the size of the operating object can be predetermined, thus it is not necessary for a range of sizes to be recognized to be switched depending on sex, a height, and the like of the user.

In the foregoing, several exemplary embodiments have been described, but in these exemplary embodiments, since an operating object is recognized as a region of a color that is indicative of the operating object, a distance to the operating object can be determined regardless of a shape of the operating object. When drawing is performed with a virtual tool, for example, a user can freely define a shape of a hand, thus the hand can take a variety of shapes, but by performing determination by an area of the hand, the hand can be determined without being limited to such a hand shape. Even when, for example, a rod, other than a hand, in a specific color is held by the hand, or a sticker is affixed to the hand, and the sticker is used as an operating object, an area thereof can be easily calculated even when an inclination of the rod or a way of handling of the rod is different, and it is possible to determine the rod without being limited to the way of handling or the like.

D. Other Aspects

The present disclosure can be implemented as the following aspects.

(1) The image display device includes an image display unit configured to display an image with at least a part of an external scene as a display region, an imaging unit configured to image a region including the display region as a captured image, an extraction unit configured to extract an operating object from the captured image as a region of a color of the operating object, a drawing mode change unit configured to change a drawing mode of the operating object in accordance with a size of the extracted region of the color, and a control unit configured to control image display in the image display unit in accordance with the changed drawing mode.

This image display device extracts the operating object as the region of the color thereof, changes the drawing mode by the size of the extracted color region, and controls the image display in the image display unit in accordance with the drawing mode. Accordingly, a distance of the operating object with respect to the imaging unit can be easily determined by the size of the operating object, and it is possible to easily change the drawing mode and control the image display. As the control of the image display, for example, performing drawing, and moving or replicating a drawn image is assumed. As a result, change of the drawing modes and the control of the image display can be implemented with an excellent response. This effect is notable, especially when capability of hardware of the image display device is not high. For the color used for determining the operating object, determination is usually performed of whether the color is within a certain range of colors or not, but the range can be a narrow range when the color of the operating object is, for example, a color of a glove or a sticker for which a color is predetermined, and it is possible to easily determine the operating object from others included in a captured image. In addition, when a range of colors of an operating object is wide such as that of a hand of a user, it is also effective to increase the range of colors when the operating object is extracted as a region of a color of the operating object, or to adjust the range of colors in accordance with the color of the hand of the user.

The determination when changing the drawing mode by the size of the extracted region of the color may be a binary determination of whether the size of the extracted region of the color is greater than or less than a predetermined threshold value, or may be determination in multiple stages depending on the size of the region. Further, as for the threshold value for the determination, a plurality of threshold values may be prepared depending on differences between the operating objects, and one may be selected. For example, when the operating object is the hand of the user of the image display device, the user may switch the threshold values in accordance with a height, sex, a body type, and the like of the user. In this case, the switching may be selected by a user, or may be selected using an image of the hand of the user captured by the imaging unit, or the like.

(2) In such an image display device, the drawing mode change unit changes the drawing mode to, a first mode in which drawing is performed when a size of a range of a color of the operating object is within a first range, which is a predetermined area range, and to a second mode in which drawing is not performed when the size of the range of the color of the operating object is not within the first range, and the control unit, in the first mode, may perform drawing in accordance with movement of the operating object, and in the second mode, may not perform the drawing. In this way, since whether or not to perform the drawing by determining the operating object is within the range for performing the drawing, only by the size of the range of the color of the operating object, the user can freely perform drawing in a simple configuration.

(3) In such an image display device, the control unit may, in the first mode, perform display of a first aspect in association with the operating object, and in the second mode, perform display of a second aspect different from the first aspect. In this way, since the display of the first aspect is performed in association with the operating object, the user can easily visually recognize whether a current drawing mode is the first mode or not. The association may be performed such that the display of the first aspect is performed near the operating object, and a display position is changed in accordance with movement of the operating object. Furthermore, the display of the second aspect, which is different from the first aspect, may be arbitrarily performed, as far as display of a shape, a range to be filled, a color, or blinking is different from the first aspect.

(4) In such an image display device, the drawing mode change unit may recognize a size of a region of a color of the operating object in the second mode in a plurality of stages depending on a degree of difference from the first range, and the control unit may display the display of the second aspect in the second mode, in different aspects depending on the stage. In this way, the user can recognize the degree that the size of the region of the color of the operating object is different with respect to the first range, and an operation is easily performed such as bringing the size of the region of the color of the operating object closer to the first range to avoid change to the first mode where the drawing mode is changed to the first mode. The degree of the difference may be determined as how the difference is small (closer to). Of course, the display of the second aspect in the second mode may not be changed.

(5) In such an image display device, the control unit may perform an aspect of display where the display of the second aspect in the second mode is brought closer to the display of the first aspect, as the stage approaches the first range. In this way, switching to the first mode corresponding to the first aspect can be further easily controlled. As a result, not only can the switching to the first mode be easily performed, but when the switching to the first mode is not wanted, it is also easy to operate the operating object in a direction in order to avoids this.

(6) In such an image display device, the control unit may perform the display of the first aspect and the display of the second aspect using a predetermined icon. In this way, since the icon is used, it is easily to understand what a current drawing mode is like. The drawing mode may be displayed by characters other than icons. Further, the icon may also include a video.

(7) In such an image display device, the control unit may display the icon closer to a center side of the display region or a tip side of the operating object than the operating object. When the icon is displayed on the center side, the icon is easily visible because the icon is arranged on the center side of the display region. In addition, when the icon is displayed on the tip side of the operating object, the user is likely to gaze at the tip of the operating object, thus the icon is easily visually recognized. The icon may be displayed on an opposite side to a side of a dominant hand with respect to the operating object in accordance with a dominant hand of the user, that is, on a left side of the operating object when the user is right-hander. In this way, the icon is displayed constantly on an identical side with respect to the operating object operated by the user, and thus is easily visually recognized. In addition, the icon may be displayed not on the tip side of the operating object, but on a terminal side, or may be displayed, in accordance with a predetermined positional relationship, for example, near a center of gravity of the operating object. The display position of the icon may be selectable by the user.

(8) In such an image display device, the size of the region of the color of the operating object may be measured in units of pixels in a captured image imaged by the imaging unit. When the size of the region of the color of the operating object is measured in units of pixels, it is sufficient to count the number of pixels determined to be in the color of the operating object, thus the processing can be made even more convenient. Of course, the size of the extracted region of the color may be measured as an area.

(9) In such an image display device, when the operating object is not included in the captured image, the control unit may display a guide associated with the operating object on the image display unit. In this way, the user can understand that it is sufficient to bring the operating object into a region including the display region of the image display unit, thereby making it easier to perform drawing using this image display device.

(10) In such an image display device, the operating object may be at least one of a finger of a user, a pen-shaped object held by the user, a sticker affixed to a hand of the user. When the finger of the user is used, the user can perform drawing without using a special operating object, and the user has little unpleasant feeling upon drawing. When the pen-shaped object held by the user is used, a color of the operating object is easily identified, and the user also has little unpleasant feeling upon drawing. When the sticker affixed to the hand of the user is used, a color of the operating object is easily identified, and it is sufficient to affix the sticker to the hand of the user, thus the sticker can be easily used.

(11) In such an image display device, the image display unit may be a display unit of a head-mounted display apparatus mounted on a head of a user, and may be a display unit with which an external scene is visible. In this way, an image can be displayed, even when the user faces an arbitrary direction, while viewing the external scene in the direction.

(12) Alternatively, in such an image display device, the image display unit may be an electronic whiteboard that displays an image on a flat surface, and the imaging unit may be an imaging unit with which a user images a region where the electronic whiteboard is present. In this way, by holding an operating object up to a front of the electronic whiteboard, a drawing mode can be easily changed by a size of a region of a color of the operating object, and drawing can be performed.

(13) Another aspect of the present disclosure is an image display method for performing drawing with at least a part of an external scene as a display region. The image display method images a region including the display region, extracts an operating object, as a region of a color of the operating object, from a captured image obtained by imaging the region, changes a drawing mode of the operating object in accordance with a size of the extracted region of the color, and controls image display in the display region in accordance with the changed drawing mode. This image display method can also implement the present disclosure in various aspects similar to the image display device described above, and the effects thereof are the same.

(14) Yet another aspect of the present disclosure is an image display program executed by a computer, to perform drawing with at least a part of an external scene as a display region. This computer program causes the computer to implement, a function of imaging a region including the display region, a function of extracting an operating object, as a region of a color of the operating object, from a captured image obtained by imaging the region, a function of changing a drawing mode of the operating object in accordance with a size of the extracted region of the color, and a function of controlling image display in the display region in accordance with the changed drawing mode. This image display program can also implement the present disclosure in various aspects similar to the image display device and the image display method described above, and the effects thereof are the same.

(15) In each of the above-mentioned exemplary embodiments, part of a configuration implemented by hardware may be replaced with software. At least part of a configuration implemented by software may also be implemented by a discrete circuit configuration. Further, when part of the functions or the entire functions of the present disclosure is achieved by the software, the software (computer program) may be provided in a form stored in a computer-readable recording medium. "Computer-readable recording medium" is not limited to a portable recording medium such as a flexible disk and a CD-ROM, but includes various internal storage devices such as a RAM and a ROM and various external storage devices fixed to a computer such as a hard disk. In other words, "computer-readable recording medium" has a broad range of definition including any recording device capable of non-transitorily and fixedly storing data packets.

The disclosure is not limited to the exemplary embodiments described above, and can be realized in various configurations without departing from the gist of the disclosure. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. An image display device, comprising:
    an image display configured to display an image with at least a part of an external scene as a display region;
    a camera configured to image, as a captured image, a region including the display region;
    a memory; and
    a processor, coupled to the memory, wherein the processor is configured to:
    extract an operating object, from the captured image, as a region of a color of the operating object;
    change a drawing mode of the operating object in accordance with a size of the extracted region of the color;
    control the image displayed in the image display in accordance with the changed drawing mode;
    change the drawing mode to, a first mode in which drawing is enabled when a size of a range of a color of the operating object is within a first range that is a predetermined area range, and to a second mode in which drawing is disabled when the size of the range of the color of the operating object is not within the first range; and
    perform, in the first mode, drawing in accordance with movement of the operating object, and not to perform the drawing in the second mode.

2. The image display device according to claim 1, wherein the processor is further configured to
    perform, in the first mode, display of a first aspect in association with the operating object, and in the second mode, performs display of a second aspect different from the first aspect.

3. The image display device according to claim 2, wherein the processor is further configured to
    recognize a size of a region of a color of the operating object in the second mode in a plurality of stages depending on a degree of difference from the first range, and
    perform display of the second aspect in the second mode in different aspects depending on the stage.

4. The image display device according to claim 3, wherein the processor is further configured to
    change the display of the second aspect in the second mode to display of an aspect closer to the display of the first aspect, as the stage becomes closer to the first range.

5. The image display device according to claim 2, wherein the processor is further configured to
    perform the display of the first aspect and the display of the second aspect using a predetermined icon.

6. The image display device according to claim 5, wherein the processor is further configured to
    display the icon closer to a center of the display region than to the operating object, or closer to a tip of the operating object.

7. The image display device according to claim 1, wherein a size of the region of the color of the operating object is measured in units of pixels in a captured image imaged by the camera.

8. The image display device according to claim 1, wherein the processor is further configured to:
    when the operating object is not included in the captured image, display a guide associated with the operating object on the image display.

9. The image display device according to claim 1, wherein the operating object is at least one of a finger of a user, a pen-shaped object held by the user, a sticker affixed to a hand of the user.

10. The image display device according to claim 1, wherein
    the image display is a display of a head-mounted display apparatus mounted on a head of a user, and is a display with which an external scene is visible.

11. The image display device according to claim 1, wherein
    the image display is an electronic whiteboard that displays an image on a flat surface, and
    the camera enables a user to image a region where the electronic whiteboard is present.

12. An image display method for performing drawing of an image with at least a part of an external scene as a display region, the method comprising:
    imaging a region including the display region;
    extracting an operating object, as a region of a color of the operating object, from a captured image obtained by imaging the region;
    changing a drawing mode of the operating object in accordance with a size of the extracted region of the color;
    controlling the image displayed in the display region in accordance with the changed drawing mode;
    changing the drawing mode to, a first mode in which drawing is enabled when a size of a range of a color of the operating object is within a first range that is a predetermined area range, and to a second mode in which drawing is disabled when the size of the range of the color of the operating object is not within the first range; and
    performing, in the first mode, drawing in accordance with movement of the operating object, and not performing the drawing in the second mode.

13. A non-transitory computer-readable storage medium comprising an image display program executed by a computer for performing drawing with at least a part of an external scene as a display region, the program causing the computer to implement
    a function of imaging a region including the display region;
    a function of extracting an operating object, as a region of a color of the operating object, from a captured image obtained by imaging the region;
    a function of changing a drawing mode of the operating object in accordance with a size of the extracted region of the color;
    a function of controlling the image displayed in the display region in accordance with the changed drawing mode;
    a function of changing the drawing mode to, a first mode in which drawing is enabled when a size of a range of a color of the operating object is within a first range that is a predetermined area range, and to a second mode in which drawing is disabled when the size of the range of the color of the operating object is not within the first range; and a function of performing, in the first mode, drawing in accordance with movement of the operating object, and not performing the drawing in the second mode.

* * * * *